(12) United States Patent
Abdallah

(10) Patent No.: US 9,928,121 B2
(45) Date of Patent: Mar. 27, 2018

(54) METHOD AND SYSTEM FOR IMPLEMENTING RECOVERY FROM SPECULATIVE FORWARDING MISS-PREDICTIONS/ERRORS RESULTING FROM LOAD STORE REORDERING AND OPTIMIZATION

(71) Applicant: Intel Corporation, Santa Clara, CA (US)

(72) Inventor: Mohammad Abdallah, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 121 days.

(21) Appl. No.: 14/567,699

(22) Filed: Dec. 11, 2014

(65) Prior Publication Data
US 2015/0095629 A1 Apr. 2, 2015

Related U.S. Application Data

(63) Continuation of application No. PCT/US2013/045730, filed on Jun. 13, 2013.
(Continued)

(51) Int. Cl.
*G06F 9/312* (2006.01)
*G06F 9/52* (2006.01)
(Continued)

(52) U.S. Cl.
CPC .......... *G06F 9/528* (2013.01); *G06F 9/30043* (2013.01); *G06F 9/3826* (2013.01);
(Continued)

(58) Field of Classification Search
CPC .... G06F 9/528; G06F 9/30043; G06F 9/3826; G06F 9/3834; G06F 9/3855;
(Continued)

(56) References Cited

U.S. PATENT DOCUMENTS

| 4,342,080 A | 7/1982 | Grondalski |
| 5,319,766 A | 6/1994 | Thaller et al. |

(Continued)

FOREIGN PATENT DOCUMENTS

| CN | 1241752 A | 1/2000 |
| CN | 1264866 A | 8/2000 |

(Continued)

OTHER PUBLICATIONS

Non-Final Office Action from U.S. Appl. No. 14/569,543, dated Nov. 21, 2016, 13 pages.
(Continued)

*Primary Examiner* — Daniel Pan
(74) *Attorney, Agent, or Firm* — NDWE LLP

(57) ABSTRACT

A method for forwarding data from the store instructions to a corresponding load instruction in an out of order processor. The method includes accessing an incoming sequence of instructions; reordering the instructions in accordance with processor resources for dispatch and execution; ensuring a closest earlier store in machine order for to a corresponding load, by determining if said store has an actual age but said corresponding load does not have an actual age, then said store is earlier than said corresponding load; if said corresponding load has an actual age but said store does not have an actual age, then said corresponding load is earlier than said store; if neither said corresponding load or said store have an actual age, then a virtual identifier table is used to determine which is earlier; and if both said corresponding load and said store have actual ages, then the actual ages are used to determine which is earlier.

18 Claims, 25 Drawing Sheets

Related U.S. Application Data

(60) Provisional application No. 61/660,538, filed on Jun. 15, 2012.

(51) Int. Cl.
*G06F 9/30* (2018.01)
*G06F 9/38* (2018.01)
*G06F 12/0831* (2016.01)

(52) U.S. Cl.
CPC .......... *G06F 9/3834* (2013.01); *G06F 9/3855* (2013.01); *G06F 9/3017* (2013.01); *G06F 9/30145* (2013.01); *G06F 9/30185* (2013.01); *G06F 9/3824* (2013.01); *G06F 12/0831* (2013.01)

(58) Field of Classification Search
CPC ............... G06F 9/30145; G06F 9/3017; G06F 9/30185; G06F 9/3824; G06F 12/0831
USPC .................................. 712/214–219
See application file for complete search history.

(56) References Cited

U.S. PATENT DOCUMENTS

| | | | |
|---|---|---|---|
| 5,339,443 A | 8/1994 | Lockwood | |
| 5,367,656 A | 11/1994 | Ryan | |
| 5,487,156 A | 1/1996 | Popescu et al. | |
| 5,553,265 A | 9/1996 | Abato et al. | |
| 5,553,266 A | 9/1996 | Metzger et al. | |
| 5,625,837 A | 4/1997 | Popescu et al. | |
| 5,748,987 A | 5/1998 | Craig | |
| 5,751,983 A | 5/1998 | Abramson et al. | |
| 5,778,245 A | 7/1998 | Papworth et al. | |
| 5,788,245 A | 8/1998 | Hada | |
| 5,943,686 A | 8/1999 | Arimilli et al. | |
| 6,006,324 A | 12/1999 | Tran et al. | |
| 6,006,326 A * | 12/1999 | Panwar ................. G06F 9/3834 711/167 | |
| 6,058,472 A | 5/2000 | Panwar et al. | |
| 6,185,660 B1 | 2/2001 | Mulla et al. | |
| 6,298,435 B1 | 10/2001 | Chan et al. | |
| 6,349,381 B1 | 2/2002 | Tremblay | |
| 6,470,444 B1 | 10/2002 | Sheaffer | |
| 6,487,639 B1 | 11/2002 | Lipasti | |
| 6,591,342 B1 | 7/2003 | Akkary et al. | |
| 6,631,460 B1 | 10/2003 | Morris et al. | |
| 6,694,421 B2 | 2/2004 | Yoaz et al. | |
| 6,738,896 B1 | 5/2004 | Webb, Jr. et al. | |
| 6,782,461 B2 | 8/2004 | Lam | |
| 6,883,086 B2 | 4/2005 | Dundas | |
| 6,920,546 B2 | 7/2005 | Gochman et al. | |
| 7,174,428 B2 * | 2/2007 | Hily ..................... G06F 9/30043 711/1 | |
| 7,340,567 B1 | 3/2008 | Chou et al. | |
| 7,343,477 B1 | 3/2008 | Thatipelli et al. | |
| 7,380,071 B2 | 5/2008 | Blumrich et al. | |
| 7,392,369 B2 | 6/2008 | Baxter et al. | |
| 7,418,552 B2 | 8/2008 | Akkary et al. | |
| 7,502,895 B2 | 3/2009 | Jones et al. | |
| 7,600,098 B1 | 10/2009 | Chou | |
| 7,606,998 B2 | 10/2009 | Asher et al. | |
| 7,703,098 B1 | 4/2010 | Moir et al. | |
| 7,890,725 B2 | 2/2011 | Praun et al. | |
| 8,006,073 B1 | 8/2011 | Ali et al. | |
| 8,041,928 B2 | 10/2011 | Burky et al. | |
| 8,135,917 B2 | 3/2012 | Blumrich et al. | |
| 8,185,700 B2 | 5/2012 | Madriles et al. | |
| 8,301,844 B2 | 10/2012 | Steely et al. | |
| 8,321,635 B2 | 11/2012 | Ish | |
| 9,043,363 B2 | 5/2015 | Dragojevic et al. | |
| 9,092,343 B2 | 7/2015 | Yu et al. | |
| 9,244,837 B2 | 1/2016 | Bhoria et al. | |
| 9,455,048 B2 | 9/2016 | Berckmann et al. | |
| 2001/0034827 A1 | 10/2001 | Mukherjee et al. | |
| 2001/0042179 A1 | 11/2001 | Ciavaglia et al. | |
| 2002/0087810 A1 | 7/2002 | Boatright et al. | |
| 2002/0141426 A1 | 10/2002 | Tanaka et al. | |
| 2002/0188817 A1 | 12/2002 | Norden et al. | |
| 2002/0199063 A1 | 12/2002 | Chaudhry et al. | |
| 2003/0065909 A1 | 4/2003 | Jourdan | |
| 2003/0097304 A1 | 5/2003 | Hunt | |
| 2003/0163660 A1 | 8/2003 | Lam | |
| 2003/0172198 A1 | 9/2003 | Tiwary et al. | |
| 2003/0196075 A1 | 10/2003 | Akkary et al. | |
| 2003/0208665 A1 | 11/2003 | Peir et al. | |
| 2003/0217251 A1 | 11/2003 | Jourdan et al. | |
| 2004/0034757 A1 | 2/2004 | Gochman et al. | |
| 2004/0044847 A1 | 3/2004 | Ray et al. | |
| 2004/0103256 A1 | 5/2004 | Flores et al. | |
| 2004/0117573 A1 | 6/2004 | Sutanto et al. | |
| 2004/0123058 A1 | 6/2004 | Hum et al. | |
| 2004/0123078 A1 | 6/2004 | Hum et al. | |
| 2004/0243790 A1 | 12/2004 | Soltis et al. | |
| 2005/0071573 A1 | 3/2005 | Dodson et al. | |
| 2005/0097304 A1 | 5/2005 | Luick | |
| 2005/0138339 A1 | 6/2005 | Hily et al. | |
| 2005/0154832 A1 | 7/2005 | Steely et al. | |
| 2005/0228971 A1 | 10/2005 | Samra et al. | |
| 2006/0026371 A1 | 2/2006 | Chrysos et al. | |
| 2006/0026594 A1 | 2/2006 | Yoshida et al. | |
| 2006/0064551 A1 | 3/2006 | Sutanto et al. | |
| 2006/0064554 A1 | 3/2006 | Fridella et al. | |
| 2006/0224836 A1 | 10/2006 | Blumrich et al. | |
| 2006/0224838 A1 | 10/2006 | Blumrich et al. | |
| 2007/0174599 A1 | 7/2007 | Dowling | |
| 2007/0204135 A1 | 8/2007 | Jiang | |
| 2007/0288694 A1 | 12/2007 | Ghai et al. | |
| 2007/0288725 A1 | 12/2007 | Luick | |
| 2008/0082794 A1 | 4/2008 | Yu et al. | |
| 2008/0134159 A1 | 6/2008 | Guo et al. | |
| 2008/0244130 A1 | 10/2008 | Jenkins et al. | |
| 2009/0013135 A1 | 1/2009 | Burger et al. | |
| 2009/0031087 A1 | 1/2009 | Gaither et al. | |
| 2009/0063782 A1 | 3/2009 | Toussi | |
| 2009/0083478 A1 | 3/2009 | Kunimatsu et al. | |
| 2009/0172255 A1 | 7/2009 | Yeh et al. | |
| 2009/0182968 A1 | 7/2009 | Arimilli et al. | |
| 2009/0198972 A1 | 8/2009 | Nystad et al. | |
| 2009/0210679 A1 | 8/2009 | Tsai et al. | |
| 2009/0240873 A1 | 9/2009 | Yu et al. | |
| 2009/0282202 A1 | 11/2009 | Krimer et al. | |
| 2009/0282225 A1* | 11/2009 | Caprioli ................. G06F 9/3826 712/225 | |
| 2009/0307434 A1 | 12/2009 | Sivaramakrishnan et al. | |
| 2010/0011166 A1 | 1/2010 | Yu et al. | |
| 2010/0017804 A1 | 1/2010 | Gupta et al. | |
| 2010/0064111 A1 | 3/2010 | Kunimatsu et al. | |
| 2010/0095151 A1 | 4/2010 | Kobayashi et al. | |
| 2010/0145969 A1* | 6/2010 | Wang ........................ G06F 9/38 707/758 | |
| 2010/0161948 A1 | 6/2010 | Abdallah | |
| 2010/0268882 A1 | 10/2010 | Cargnoni et al. | |
| 2010/0274972 A1 | 10/2010 | Babayan et al. | |
| 2010/0281220 A1 | 11/2010 | Cantin et al. | |
| 2010/0293347 A1* | 11/2010 | Luttrell ................. G06F 9/3851 711/156 | |
| 2010/0299484 A1 | 11/2010 | Hooker et al. | |
| 2010/0306477 A1 | 12/2010 | Luttrell | |
| 2010/0306507 A1 | 12/2010 | Day et al. | |
| 2011/0040955 A1 | 2/2011 | Hooker et al. | |
| 2011/0047350 A1 | 2/2011 | Geissler et al. | |
| 2011/0078697 A1 | 3/2011 | Smittle et al. | |
| 2011/0119470 A1 | 5/2011 | Ohmacht | |
| 2011/0138393 A1 | 6/2011 | Venkumahanti et al. | |
| 2011/0161632 A1 | 6/2011 | Sha et al. | |
| 2011/0185159 A1 | 7/2011 | Bishop et al. | |
| 2011/0225297 A1 | 9/2011 | Archer et al. | |
| 2012/0110280 A1 | 5/2012 | Bryant | |
| 2012/0117323 A1 | 5/2012 | Cypher et al. | |
| 2012/0117332 A1 | 5/2012 | Ish | |
| 2012/0117335 A1 | 5/2012 | Bryant | |
| 2012/0124587 A1 | 5/2012 | Li et al. | |
| 2012/0137077 A1 | 5/2012 | Shah et al. | |

(56) References Cited

U.S. PATENT DOCUMENTS

| | | | |
|---|---|---|---|
| 2012/0198174 | A1 | 8/2012 | Nellans et al. |
| 2013/0024661 | A1 | 1/2013 | Abdallah |
| 2014/0095809 | A1 | 4/2014 | Moll et al. |
| 2015/0095588 | A1 | 4/2015 | Abdallah |
| 2015/0095618 | A1 | 4/2015 | Abdallah |
| 2015/0100734 | A1 | 4/2015 | Abdallah |
| 2015/0100766 | A1 | 4/2015 | Abdallah |
| 2015/0134934 | A1 | 5/2015 | Abdallah |
| 2015/0199272 | A1 | 7/2015 | Goel et al. |
| 2015/0205605 | A1 | 7/2015 | Abdallah |
| 2015/0211021 | A1 | 7/2015 | De |
| 2016/0154817 | A1 | 6/2016 | Mason, Jr. et al. |

FOREIGN PATENT DOCUMENTS

| | | |
|---|---|---|
| CN | 1307700 A | 8/2001 |
| CN | 1095117 C | 11/2002 |
| CN | 1383511 A | 12/2002 |
| CN | 1728087 A | 2/2006 |
| CN | 1732433 A | 2/2006 |
| CN | 101013402 A | 8/2007 |
| CN | 101055546 A | 10/2007 |
| CN | 101449250 A | 6/2009 |
| CN | 101449256 A | 6/2009 |
| CN | 101501659 A | 8/2009 |
| CN | 101542430 A | 9/2009 |
| CN | 101627365 A | 1/2010 |
| CN | 101689143 A | 3/2010 |
| CN | 101447911 B | 12/2010 |
| CN | 101901132 A | 12/2010 |
| CN | 101944068 A | 1/2011 |
| EP | 0871109 | 10/1998 |
| EP | 0871109 B1 | 6/2003 |
| EP | 1612661 A2 | 1/2006 |
| JP | 3727887 B2 | 12/2005 |
| KR | 20090110920 A | 10/2009 |
| KR | 20110050725 A | 5/2011 |
| TW | 200511023 A | 3/2005 |
| TW | 200815992 A | 4/2008 |
| TW | 200837568 A | 9/2008 |
| TW | 201124842 A | 7/2011 |
| WO | 9802804 A1 | 1/1998 |
| WO | 0150252 A1 | 7/2001 |
| WO | 0150256 A1 | 7/2001 |
| WO | 0163240 A2 | 8/2001 |
| WO | 2008061154 A2 | 5/2008 |
| WO | 2011107170 A1 | 9/2011 |

OTHER PUBLICATIONS

Non-Final Office Action from U.S. Appl. No. 14/569,551, dated Nov. 22, 2016, 10 pages.
Non-final Office Action from U.S. Appl. No. 14/569,554, dated Jun. 29, 2016, 52 pages.
Notice of Allowance and Search Report from foreign counterpart Taiwan Patent Application No. 102121094, dated Jan. 26, 2017, 4 pages.
Notice of Allowance and Search Report from foreign counterpart Taiwan Patent Application No. 102121096, dated Jan. 26, 2017, 4 pages.
Notice of Allowance from counterpart Taiwan Patent Application No. 102121092, dated Jan. 18, 2017, 3 pages.
Notice of Allowance from foreign counterpart Korean Patent Application No. 10-2015-7000751, dated Aug. 30, 2017, 3 pages.
Notice of Allowance from U.S. Appl. No. 14/559,740, dated May 22, 2017, 19 pages.
Notice of Allowance from U.S. Appl. No. 14/567,731, dated Jan. 31, 2017, 7 pages.
Notice of Allowance from U.S. Appl. No. 14/567,731, dated Jul. 19, 2017, 17 pages.
Notice of Allowance from U.S. Appl. No. 14/567,797, dated Jun. 7, 2017, 19 pages.
Notice of Allowance from U.S. Appl. No. 14/569,543, dated Aug. 24, 2017, 19 pages.
Notice of Allowance from U.S. Appl. No. 14/569,543, dated Feb. 15, 2017, 11 pages.
Notice of Allowance from U.S. Appl. No. 14/569,551, dated Aug. 3, 2017, 15 pages.
Notice of Allowance from U.S. Appl. No. 14/569,551, dated Feb. 10, 2017, 9 pages.
Notice of Preliminary Rejection from foreign counterpart Korean Patent Application No. 10-2015-7000693, dated May 26, 2017, 9 pages.
Notice of Preliminary Rejection from foreign counterpart Korean Patent Application No. 10-2015-7000708, dated Apr. 28, 2017, 10 pages.
Notice of Preliminary Rejection from foreign counterpart Korean Patent Application No. 10-2015-7000751, dated Apr. 5, 2017, 9 pages.
Notice of Preliminary Rejection from foreign counterpart Korean Patent Application No. 20157000647, dated Apr. 28, 2017, 9 pages.
Notice on Grant of Patent from foreign counterpart China Patent Application No. 201380043007.5, dated Apr. 6, 2017, 4 pages.
Notification of Reason for Refusal for foreign counterpart Korean Application No. 10-2015-7000652, dated Aug. 23, 2016, 11 pages.
Notification of Reason for Refusal from foreign counterpart Korean Patent Application No. 1020157000653, dated Jan. 26, 2017, 8 pages.
Notification of Reason for Refusal from foreign counterpart Korean Patent Application No. 1020157000653, dated Jul. 29, 2016, 4 pages.
Notification of Reason for Refusal from foreign counterpart Korean Patent Application No. 20157000647, dated Aug. 30, 2016, 5 pages.
Notification of Reason for Refusal from foreign counterpart Korean Patent Application No. 20157000693, dated Aug. 23, 2016, 10 pages.
Notification of Reason for Refusal from foreign counterpart Korean Patent Application No. 20157000751, dated Jan. 20, 2016, 4 pages.
Notification of Reason for Refusal from foreign counterpart Korean Patent Application No. 20157000751, dated Jul. 29, 2016, 7 pages.
Notification of Reason for Refusal from foreign counterpart Korean Patent Application No. KR1020157000708, dated Apr. 28, 2017, 10 pages.
Notification of Reason for Refusal from foreign counterpart Korean Patent Application No. KR1020157000708, dated Aug. 30, 2016, 6 pages.
Notification of Reason for Refusal from Korean Application No. 1020157000678, dated Feb. 28, 2017, 12 pages.
Notification of Reasons for Refusal from foreign counterpart Korean Application No. 10-2015-7000654, dated Jan. 18, 2016, 5 pages.
Notification of Reasons for Refusal from foreign counterpart Korean Application No. 10-2015-7000654, dated Jul. 4, 2016, 5 pages.
Notification of Reasons for Refusal from foreign counterpart Korean Application No. 10-2015-7000695, dated Aug. 23, 2016, 5 pages.
Notification of Reasons for Refusal from foreign counterpart Korean Application No. 10-2015-7000695, dated Feb. 28, 2017, 8 pages.
Office Action and Search report from foreign counterpart China Patent Application No. 201380043007.5, dated Sep. 9, 2016, 9 pages.
Office action and search report from foreign counterpart China Patent Application No. CN201380043000, dated Oct. 28, 2016, 11 pages.
Office Action and Search Report from foreign counterpart Taiwan Patent Application No. 102121087, dated Nov. 9, 2016, 11 pages. (Translation only available).
Office Action and Search Report from foreign counterpart Taiwan Patent Application No. 102121100, dated Nov. 22, 2016, 10 pages. (English translation only available).
Office Action and Search Report from foreign counterpart Taiwan Patent Application No. 102121102, dated May 18, 2017, 9 pages.

(56) References Cited

OTHER PUBLICATIONS

Office Action and Search Report from foreign counterpart Taiwan Patent Application No. 20130121088, dated Nov. 28, 2016, 6 pages.
Office Action from foreign counterpart China Patent Application No. 201380043001.8, dated Aug. 22, 2016, 10 pages.
Office Action from foreign counterpart Korean Patent Application No. 20157000678, dated Aug. 30, 2016, 4 pages.
Second Office Action from foreign counterpart China Patent Application No. 201380042996.6, dated May 3, 2017, 13 pages.
Second Office Action from foreign counterpart Chinese Patent Application No. 201380042999.X, dated Aug. 25, 2017, 27 pages.
Second Office Action from foreign counterpart Chinese Patent Application No. 201380043002, dated Mar. 9, 2017, 39 pages.
Second Office Action with English translation from foreign counterpart Chinese Patent Application No. 201380043001, dated Apr. 1, 2017, 8 pages.
Shirur, et al., "Performance Analysis of 8-Bit Pipelined Asynchronous Processor Core," Design and Reuse, retrieved from https://www.design-reuse.com/articles/35659/8-bit-pipelined-asynchronous-processor-core.html on May 24, 2017, 18 pages.
Slosiar, et al., "MD3Q: A distributed queueing protocol with full channel capacity re-use and guarantee of bandwidth," Computer Networks and ISDN Systems, Mar. 1, 1994, vol. 26 (6-8), pp. 799-815.
Stone S.S., et al., "Address-Indexed Memory Disambiguation and Store-to-Load Forwarding," Proceedings of the 38th International Symposium on Microarchitecture, Nov. 16, 2005, pp. 171-182.
Tremblay, et al., "Improving Resource Utilization in an Multiple Asynchronous ALU DSP architecture," IEEE Explore, Nov. 21, 2008, pp. 25-28, retrieved from http://ieeexplore.ieee.org/document/4683369/ on May 23, 2017.
Decision to Grant a Patent for Korean Patent Application No. 20157000752, dated Jul. 29, 2016, 2 pages.
Extended European Search Report for Application No. EP13803753, dated Oct. 31, 2016, 8 pages.
First Office Action and Search Report from foreign counterpart Chinese Patent Application No. 201380042999, dated Dec. 19, 2016, 13 pages.
International Preliminary Report on Patentability for Application No. PCT/US2013/045730, dated Dec. 24, 2014, 7 pages.
International Search Report and Written Opinion for Application No. PCT/US2013/045730, dated Sep. 27, 2013, 8 pages.
Notification of Reason for Refusal from foreign counterpart Korean Patent Application No. 20157000752, dated Jan. 20, 2016, 7 pages.
Wenisch T.F., et al.,"Mechanisms for Store-Wait-Free multiprocessors," Proceedings of the 34th Annual International Symposium on Computer Architecture, 2007, pp. 266-277.
Written Opinion for Application No. PCT/US2013/045497, dated Aug. 30, 2013, 6 pages.
First Office Action and Search Report from foreign counterpart China Patent Application No. 201380043003.7, dated Sep. 8, 2017, 9 pages. (Translation available only for office action).
First Office Action and Search Report from foreign counterpart China Patent Application No. 201380043004.1, dated Jul. 31, 2017, 22 pages.
First Office Action and Search Report from foreign counterpart China Patent Application No. 201380043005.6, dated Jul. 31, 2017, 19 pages.
Non-Final Office Action from U.S. Appl. No. 14/560,974, dated Sep. 28, 2017, 108 pages.
Non-final Office Action from U.S. Appl. No. 14/563,583, dated Sep. 25, 2017, 92 pages.
Non-Final Office Action from U.S. Appl. No. 14/569,537, dated Sep. 22, 2017, 90 pages.
Non-final Office Action from U.S. Appl. No. 14/569,554, dated Sep. 25, 2017, 90 pages.
Advisory Action from U.S. Appl. No. 14/560,974, dated Jun. 9, 2017, 3 pages.
Allowance Decision of Examination from foreign counterpart Taiwan Patent Application No. 102121087, dated Aug. 8, 2017, 3 pages.
Anonymous: "Memory disambiguation—Wikipedia," Apr. 24, 2011, Retrieved from the Internet: URL: https://en.wikipedia.org/w/index.php?title=Memorydisambiguation&oldid=425585684.
Castro F., et al.,"Memory Disambiguation Hardware: a Review," Journal of Computer Science & Technology, Oct. 1, 2008, pp. 132-139.
Decision to grant a patent from foreign counterpart Korean Application No. 10-2015-7000654, dated Oct. 27, 2016, 2 pages.
Extended European Search Report for Application No. EP13803443, dated Nov. 22, 2016, 9 pages.
Extended European Search Report for Application No. EP13803665, dated Nov. 22, 2016, 9 pages.
Extended European Search Report for Application No. EP13803692, dated Nov. 22, 2016, 8 pages.
Extended European Search Report for Application No. EP13804226, dated Oct. 31, 2016, 8 pages.
Extended European Search Report for Application No. EP13804462, dated Nov. 29, 2016, 8 pages.
Extended European Search Report for Application No. EP13804852, dated Nov. 28, 2016, 7 pages.
Extended European Search Report for Application No. EP13804863, dated Nov. 22, 2016, 10 pages.
Extended European Search Report for Application No. EP13805015, dated Nov. 11, 2016, 8 pages.
Extended European Search Report for Application No. EP13805130, dated Nov. 22, 2016, 9 pages.
Final Office Action from U.S. Appl. No. 14/559,740, dated Jan. 19, 2017, 23 pages.
Final Office Action from U.S. Appl. No. 14/560,974, dated Mar. 17, 2017, 68 pages.
Final Office Action from U.S. Appl. No. 14/563,583, dated Jun. 2, 2017, 59 pages.
Final Office Action from U.S. Appl. No. 14/567,797, dated Jan. 24, 2017, 16 pages.
Final Office Action from U.S. Appl. No. 14/569,537, dated May 18, 2017, 78 pages.
Final Office Action from U.S. Appl. No. 14/569,554, dated Jun. 2, 2017, 71 pages.
First Office Action and Search Report for foreign counterpart China Application No. 201380042996.6, dated Aug. 26, 2016, 27 pages.
First Office Action and Search Report from foreign counterpart Chinese Patent Application No. 201380042998.5, dated Jun. 28, 2017, 16 pages.
First Office Action from foreign counterpart Chinese Patent Application No. 201380043002, dated Jul. 5, 2016, 12 pages.
Grant of Patent for foreign counterpart Korean Application No. 10-2015-7000652, dated Feb. 28, 2017, 2 pages.
Hammond L., et al., "Transactional Memory Coherence and Consistency," Proceedings of the 31st Annual International Symposium on Computer Architecture (ISCA), 2004, pp. 102-13 (http://csl.stanford.edu/~christos/publications/2004.tcc.isca.pdf).
International Preliminary Report on Patentability for Application No. PCT/US2013/045008, dated Dec. 24, 2014, 6 pages.
International Preliminary Report on Patentability for Application No. PCT/US2013/045020, dated Dec. 24, 2014, 7 pages.
International Preliminary Report on Patentability for Application No. PCT/US2013/045193, dated Dec. 24, 2014, 8 pages.
International Preliminary Report on Patentability for Application No. PCT/US2013/045261, dated Dec. 24, 2014, 8 pages.
International Preliminary Report on Patentability for Application No. PCT/US2013/045470, dated Dec. 24, 2014, 6 pages.
International Preliminary Report on Patentability for Application No. PCT/US2013/045497, dated Dec. 24, 2014, 8 pages.
International Preliminary Report on Patentability for Application No. PCT/US2013/045722, dated Dec. 24, 2014, 7 pages.
International Preliminary Report on Patentability for Application No. PCT/US2013/045734, dated Dec. 24, 2014, 7 pages.
International Preliminary Report on Patentability for Application No. PCT/US2013/045863, dated Dec. 24, 2014, 6 pages.

(56) References Cited

OTHER PUBLICATIONS

International Search Report and Written Opinion for Application No. PCT/US2013/045008, dated Oct. 7, 2013, 7 pages.
International Search Report and Written Opinion for Application No. PCT/US2013/045020, dated Oct. 28, 2013, 8 pages.
International Search Report and Written Opinion for Application No. PCT/US2013/045193, dated Jan. 22, 2014, 9 pages.
International Search Report and Written Opinion for Application No. PCT/US2013/045261, dated Jan. 29, 2014, 9 pages.
International Search Report and Written Opinion for Application No. PCT/US2013/045470, dated Jul. 22, 2013, 7 pages.
International Search Report and Written Opinion for Application No. PCT/US2013/045722, dated Dec. 2, 2013, 8 pages.
International Search Report and Written Opinion for Application No. PCT/US2013/045734, dated Feb. 4, 2014, 8 pages.
International Search Report and Written Opinion for Application No. PCT/US2013/045863, dated Sep. 27, 2013, 7 pages.
International Search Report for Application No. PCT/US2013/045497, dated Aug. 30, 2013, 3 pages.
Microsoft Computer Dictionary [online], 5th edition, Microsoft Press 2002 [retrieved on May 23, 2017]. Retrieved from the Internet URL:http://ieeexplore.ieee.org/document/4683369/>https://www.linkedtech.com/downloads/pcdictionary.pdf, p. 38, ISBN 0-7356-1495-4.
Non-Final Office Action from U.S. Appl. No. 14/559,740, dated Oct. 31, 2016, 21 pages.
Non-Final Office Action from U.S. Appl. No. 14/560,974, dated Aug. 30, 2016, 67 pages.
Non-final Office Action from U.S. Appl. No. 14/563,583, dated Jul. 6, 2016, 54 pages.
Non-Final Office Action from U.S. Appl. No. 14/567,731, dated Nov. 2, 2016, 12 pages.
Non-Final Office Action from U.S. Appl. No. 14/567,797, dated Nov. 15, 2016, 14 pages.
Non-Final Office Action from U.S. Appl. No. 14/569,537, dated Jun. 29, 2016, 61 pages.
Notice of Allowance and Search Report from foreign counterpart Taiwan Patent Application No. 106105042, dated Nov. 17, 2017, 4 pages. (Translation available only for search report).
Notice of Allowance from foreign counterpart Korean Patent Application No. 10-2015-7000693, dated Nov. 29, 2017, 3 pages.
Notice of Allowance from foreign counterpart Korean Patent Application No. 10-2015-7000708, dated Oct. 31, 2017, 3 pages.
Notice of Allowance from U.S. Appl. No. 14/559,740, dated Oct. 26, 2017, 52 pages.
Notice of Allowance from U.S. Appl. No. 14/567,797, dated Jan. 9, 2018, 37 pages.
Notice on Grant from foreign counterpart China Patent Application No. 201380042996.6, dated Oct. 30, 2017, 4 pages.
Notice on Grant of Patent from foreign counterpart Chinese Patent Application No. 201380043002.2, dated Nov. 10, 2017, 4 pages.
Office Action and Search Report from foreign counterpart Taiwan Patent Application No. 106106345, dated Jan. 9, 2018, 14 pages.
Third Office Action and Search Report from foreign counterpart Chinese Patent Application No. 201380043001.8, dated Oct. 24, 2017, 16 pages.
Third Office Action from foreign counterpart Chinese Patent Application No. 201380042999.X, dated Dec. 21, 2017, 18 pages.

* cited by examiner

METHOD AND SYSTEM FOR IMPLEMENTING RECOVERY FROM SPECULATIVE FORWARDING MISS-PREDICTIONS/ERRORS RESULTING FROM LOAD STORE REORDERING AND OPTIMIZATION

CROSS-REFERENCE TO RELATED APPLICATIONS

This application is a continuation of International Application No. PCT/US2013/045730, filed Jun. 13, 2013, which claims the benefit of U.S. Provisional Application No. 61/660,538, filed Jun. 15, 2012a, which are hereby incorporated by reference.

FIELD OF THE INVENTION

The present invention is generally related to digital computer systems, more particularly, to a system and method for selecting instructions comprising an instruction sequence.

BACKGROUND OF THE INVENTION

Processors are required to handle multiple tasks that are either dependent or totally independent. The internal state of such processors usually consists of registers that might hold different values at each particular instant of program execution. At each instant of program execution, the internal state image is called the architecture state of the processor.

When code execution is switched to run another function (e.g., another thread, process or program), then the state of the machine/processor has to be saved so that the new function can utilize the internal registers to build its new state. Once the new function is terminated then its state can be discarded and the state of the previous context will be restored and execution resumes. Such a switch process is called a context switch and usually includes 10's or hundreds of cycles especially with modern architectures that employ large number of registers (e.g., 64, 128, 256) and/or out of order execution.

In thread-aware hardware architectures, it is normal for the hardware to support multiple context states for a limited number of hardware-supported threads. In this case, the hardware duplicates all architecture state elements for each supported thread. This eliminates the need for context switch when executing a new thread. However, this still has multiple draw backs, namely the area, power and complexity of duplicating all architecture state elements (i.e., registers) for each additional thread supported in hardware. In addition, if the number of software threads exceeds the number of explicitly supported hardware threads, then the context switch must still be performed.

This becomes common as parallelism is needed on a fine granularity basis requiring a large number of threads. The hardware thread-aware architectures with duplicate context-state hardware storage do not help non-threaded software code and only reduces the number of context switches for software that is threaded. However, those threads are usually constructed for coarse grain parallelism, and result in heavy software overhead for initiating and synchronizing, leaving fine grain parallelism, such as function calls and loops parallel execution, without efficient threading initiations/auto generation. Such described overheads are accompanied with the difficulty of auto parallelization of such codes using state of the art compiler or user parallelization techniques for non-explicitly/easily parallelized/threaded software codes.

SUMMARY OF THE INVENTION

In one embodiment the present invention is implemented as a method for forwarding data from the store instructions to a corresponding load instruction in an out of order processor. The method includes accessing an incoming sequence of instructions; reordering the instructions in accordance with processor resources for dispatch and execution; ensuring a closest earlier store in machine order for to a corresponding load, by determining if said store has an actual age but said corresponding load does not have an actual age, then said store is earlier than said corresponding load; if said corresponding load has an actual age but said store does not have an actual age, then said corresponding load is earlier than said store; if neither said corresponding load or said store have an actual age, then a virtual identifier table is used to determine which is earlier; and if both said corresponding load and said store have actual ages, then the actual ages are used to determine which is earlier.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION OF THE INVENTION

Figure 1:
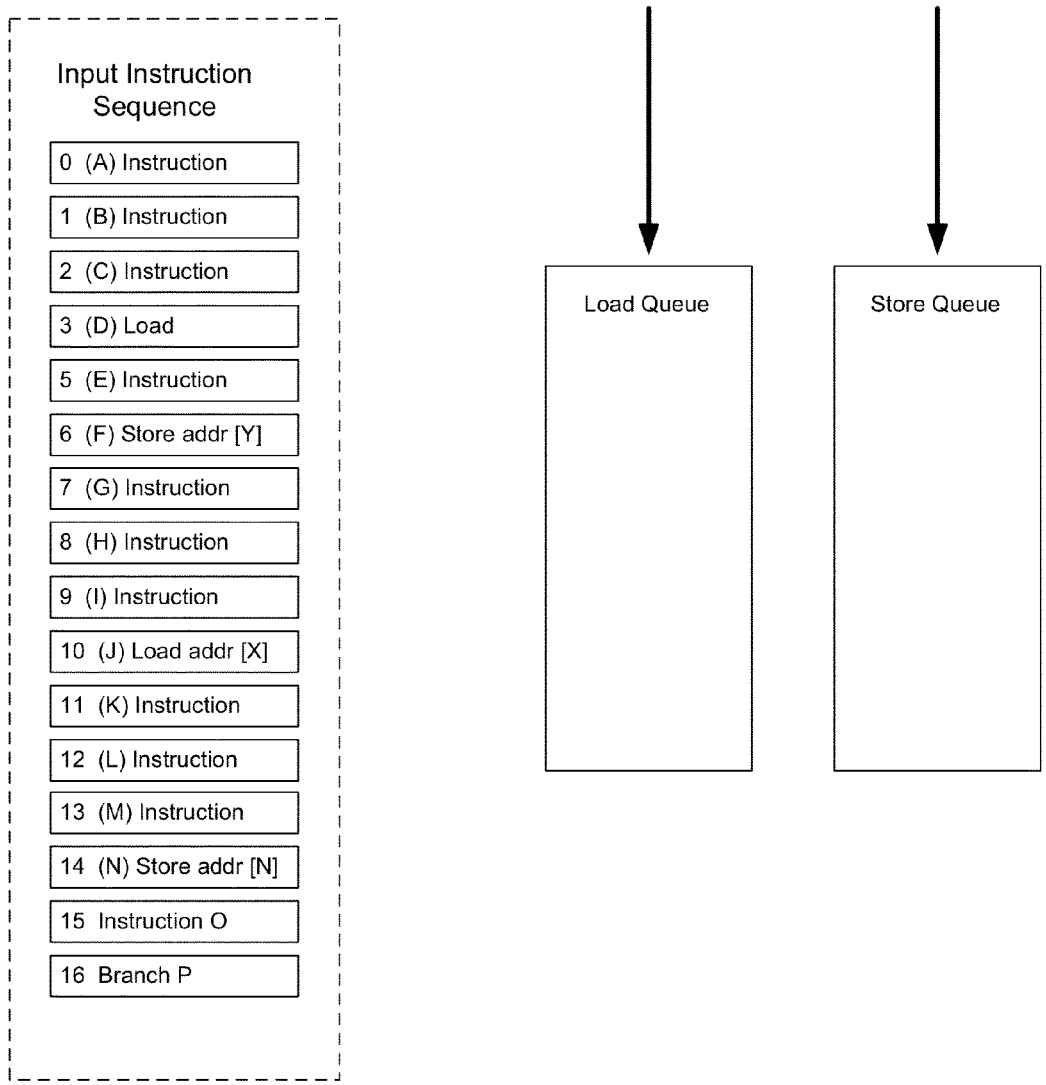
FIG. 1 shows a load queue and a store queue in accordance with one embodiment of the present invention.

Although the present invention has been described in connection with one embodiment, the invention is not intended to be limited to the specific forms set forth herein. On the contrary, it is intended to cover such alternatives, modifications, and equivalents as can be reasonably included within the scope of the invention as defined by the appended claims.

In the following detailed description, numerous specific details such as specific method orders, structures, elements, and connections have been set forth. It is to be understood however that these and other specific details need not be utilized to practice embodiments of the present invention. In other circumstances, well-known structures, elements, or connections have been omitted, or have not been described in particular detail in order to avoid unnecessarily obscuring this description.

References within the specification to "one embodiment" or "an embodiment" are intended to indicate that a particular feature, structure, or characteristic described in connection with the embodiment is included in at least one embodiment of the present invention. The appearance of the phrase "in one embodiment" in various places within the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals of a computer readable storage medium and are capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "writing" or "storing" or "replicating" or the like, refer to the action and processes of a computer system, or similar electronic computing device that manipulates and transforms data represented as physical (electronic) quantities within the computer system's registers and memories and other computer readable media into other data similarly represented as physical quantities within the computer system memories or registers or other such information storage, transmission or display devices.

Embodiments of the present invention implement an out of order instruction scheduling process, where instructions within an input instruction sequence are allowed to issue, out of order, as soon as processor resources are available to execute them. Embodiments of the present invention are able to ensure that external agents see instructions execute in order (e.g., memory consistency rules/models). Ensuring instructions visibly execute in order to the external agents thereby ensures error-free program execution. Embodiments of the present invention ensure that the memory hierarchy (e.g., L1 cache, L2 cache, system memory, etc.) of the processor sees a consistent in order execution of the instructions.

FIG. 1 shows a load queue and a store queue in accordance with one embodiment of the present invention. FIG. 1 also shows an input instruction sequence. As described above, the memory hierarchy (e.g., L1 cache, L2 cache, system memory, etc.) of the processor sees a consistent in order execution of the instructions. The load queue and the store queue, hereafter often referred to as load/store queue, can be used to keep the semantics of in order execution.

Additionally, out of order execution of the loads and the stores leads to speculative execution. When performing speculative execution, the machine needs to recognize speculative errors. In the FIG. 1 embodiment, the load/store queue provides a system for implementing recovery from speculative forwarding or miss-predictions/errors resulting from load store reordering and optimization. The load/store queue comprises the hardware support that allows for recovering from speculative errors resulting from load store reordering/optimizing as a result of forwarding, branches and faults. To allow the machine to recover from speculative errors, the results of the speculative execution are maintained in the load queue and the store queue. The load queue and the store queue holds results of the speculative execution until errors can be corrected and the store results can be retired to memory. The speculative execution contents of the load queue and the store queue are not visible to external agents. With respect to visibility, stores need to be retired to memory in order.

Figure 2:
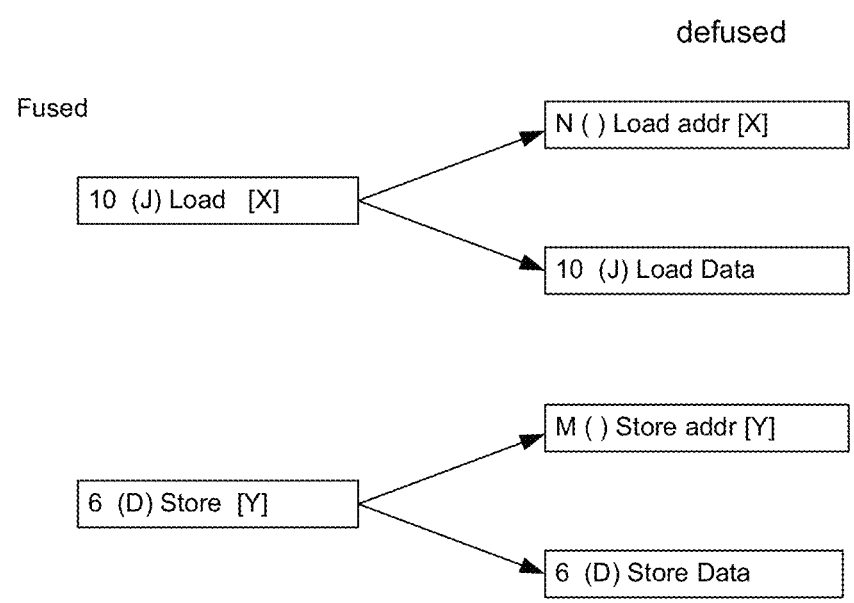
FIG. 2 shows a first diagram of load and store instruction splitting in accordance with one embodiment of the present invention.

FIG. 2 shows a first diagram of load and store instruction splitting in accordance with one embodiment of the present invention. One feature of the invention is the fact that loads are split into two macroinstructions, the first does address calculation and fetch into a temporary location (load store queue), and the second is a load of the memory address contents (data) into a register or an ALU destination. It should be noted that although the embodiments of the invention are described in the context of splitting load and store instructions into two respective macroinstructions and reordering them, the same methods and systems can be implemented by splitting load and store instructions into two respective microinstructions and reordering them within a microcode context.

The functionality is the same for the stores. Stores are also split into two macroinstructions. The first instruction is a store address and fetch, the second instruction is a store of the data at that address. The split of the stores and two instructions follows the same rules as described below for loads.

The split of the loads into two instructions allows a runtime optimizer to schedule the address calculation and fetch instruction much earlier within a given instruction sequence. This allows easier recovery from memory misses by prefetching the data into a temporary buffer that is separate from the cache hierarchy. The temporary buffer is used in order to guarantee availability of the pre-fetched data on a one to one correspondence between the LA/SA and the LD/SD. The corresponding load data instruction can reissue if there is an aliasing with a prior store that is in the window between the load address and the load data (e.g., if a forwarding case was detected from a previous store), or if there is any fault problem (e.g., page fault) with the address calculation. Additionally, the split of the loads into two instructions can also include duplicating information into the two instructions. Such information can be address information, source information, other additional identifiers, and the like. This duplication allows independent dispatch of LD/SD of the two instructions in absence of the LA/SA.

The load address and fetch instruction can retire from the actual machine retirement window without waiting on the load data to come back, thereby allowing the machine to make forward progress even in the case of a cache miss to that address (e.g., the load address referred to at the beginning of the paragraph). For example, upon a cache miss to that address (e.g., address X), the machine could possibly be stalled for hundreds of cycles waiting for the data to be fetched from the memory hierarchy. By retiring the load address and fetch instruction from the actual machine retirement window without waiting on the load data to come back, the machine can still make forward progress.

It should be noted that the splitting of instructions enables a key advantage of embodiments of the present invention to re-order the LA/SA instructions earlier and further away from LD/SD the instruction sequence to enable earlier dispatch and execution of the loads and the stores.

Figure 3:
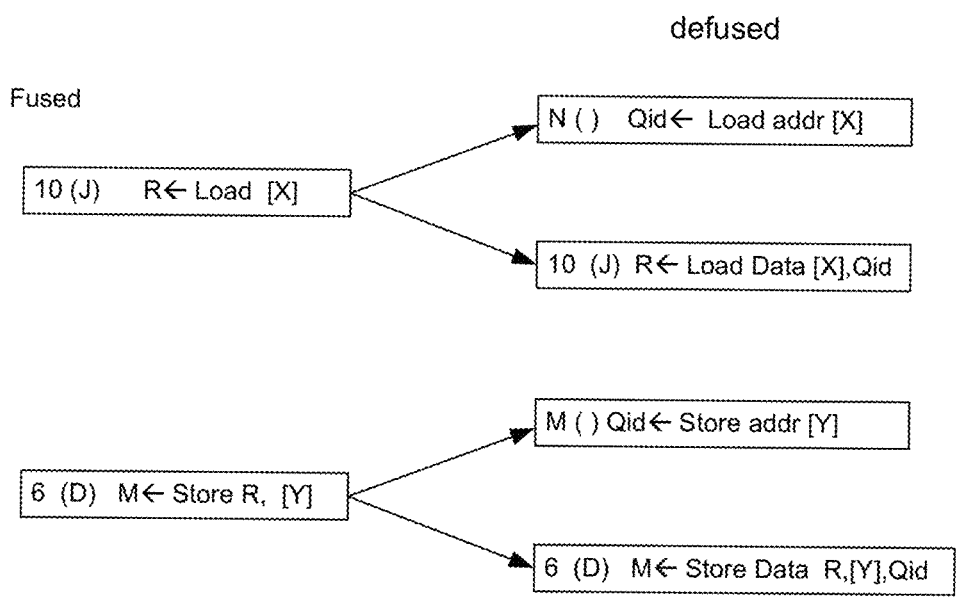
FIG. 3 shows a second diagram of load and store instruction splitting in accordance with one embodiment of the present invention.

FIG. 3 shows a second diagram of load and store instruction splitting in accordance with one embodiment of the present invention. The FIG. 2 embodiment shows how a duplication feature is used in order to enact the splitting of the load instructions. In this embodiment, the loads are duplicated into two macroinstructions, the first does address calculation and fetch into a temporary location (load store queue), and the second is a load of the memory address contents (data) into a register or an ALU destination. It should be noted that although the embodiments of the invention are described in the context of duplicating load and store instructions into two respective macroinstructions and reordering them, the same methods and systems can be implemented by duplicating load and store instructions into two respective microinstructions and reordering them within a microcode context.

A more detailed description of the instruction splitting functionality in accordance with one embodiment of the present invention is now described. In one embodiment, the instruction set does not have direct analogue instructions to LA, SA, LD or SD. In such an embodiment, these concepts are realized with a combination of instruction prefixes, LAF, SAF, LASAF and a companion suffix instruction. And a set of instructions that roughly do map onto the LA has LAD and SA has SAD, and a combined LADSAD can be implemented. These concepts can also be implemented as micro-instructions within microcode.

a) What is defined here as LAF-prefix+suffix instruction can be described as an 'LD'.
b) What is defined here as SAF-prefix+suffix instruction can be described as an 'SD'.
c) What is defined here as LAD instruction can be described as an 'LA'.
d) What is defined here as SAD instruction can be described as an 'SA'.
e) Further we have a LASAF instruction and LADSAD instruction. These instructions comprise a combined LAF/SAF-prefix+suffix instruction which could be used to implement semaphore (locked-atomic) operations. It is possible to also define a combined LAD-SAD instruction to again pre-fetch the memory operands, with resultant complexity in hardware.

LAD stands for 'LA-defused'

The LAD instruction initiates a data-prefetch into the execution pipeline. It differs from a normal prefetch in that it loads directly into the execution pipeline affording lower execution latencies than first level caches. In one embodiment, this functionality is implemented by using a fixed storage for the LA-LD pair that can be tagged using the ID link between the LA-LD pair (e.g., the QID number. The LAD instruction calculates an effective memory addresses (e.g., from potentially a complex specification), specify operand size (byte, half word, word, double word, or larger); initiate the memory reference; through the TLB and cache hierarchy. Exceptions (page walk miss, privilege, protections,) are recorded to be reported at LAF+suffix execution OR an alternate implementation could cancel/invalidate the Q entry, forcing the LAF+suffix instruction to re-execute and it to take the exceptions.

The LAD instruction has the general format and operands:
LAD(os) QID,M[EA]
EA—is the effective address specification, which may be a combination of base-register, indexing register, shifting factors and/or indexing offset. E.g. M[B,RI,sf,offset]
 os—is an indication of number of bytes to be read
 QID—is the load memory QID to be used for the memory reference operation. It is also used to link the LAD's operation and a subsequent LAF-prefixed instruction. The QID is in the range of 1 to N, N is an implementation specific value. Expected values are 31, 63, 127. The QID=0 is reserved for the special case of LAF instruction which have no antecedent LAD. The QID=0 is always used immediately by the LAF, as such is not available for a LAD. LAF stands for 'LA-fused'.

LAF is an instruction prefix, meaning it must be directly coupled (or fused) with a suffix instruction. The suffix instruction can be stand alone. The suffix instruction can be any instruction that has at least one source register. The LAF as a prefix must be coupled. The LAF-prefix changes the nature of the suffix instruction. One or more of its register operands is redefined by the prefix as a memory queue identifier (QID). Further the data associated as being sourced from the register, now is sourced from the memory queue.

A LAF-prefix+suffix instruction may or may not have an antecedent LAD instruction. If the QID==0, then the LAF is without an antecedent LAD. If the QID !=0, then the LAF has or had an antecedent LAD. When it is intended to create a split of the load instruction into LA and LD, then the LAF will have a QID!=0 and an LAD will be instantiated with the same QID preceding the LAF (e.g., this basically creates the split LA/LD pair).

When the LAF/suffix executes and has QID==0, the 0 entry of the memory queue is used to do an 'LA' operation, memory read, stage data into the memory queue, and then completed by loading the data into the suffix instruction sources and the operation applied combined with potential other sources and the result written to the suffix instructions destination register(s). On the other hand, if the QID!=0, then the memory queue is consulted (lookup) for a matching QID, if present the data is read from the memory queue and the operation of the suffix instruction is applied, and result written to the destinations register. If the matching QID is valid but not complete, the data is stalled until data is available. If the QID is not valid, then the LAF has sufficient enough information (address and data-operand-size) to restart the operation. A matching QID may not be present for a variety of reasons, some of which are:
a) The antecedent LAD never executed, bad coding, or other reason.
b) the execution flow between LAF and the antecedent LAD was broken by exception or interrupt
c) An intervening store-operations aliased with the LAD's address and invalidated its data integrity.

In any of these cases, the LAF prefix+suffix have sufficient information to repeat the LAD (LA) operation. This capability makes our LAD instruction into a hint. The LAD did not have to successfully execute or for that matter to be even be implemented beyond being a NOP for correct code to use it.

The general format and operands of a LAF instruction with a suffix instruction is:
LAF M[ea]
SUFFIX(os) Rt,QID, . . . .
The LAF instruction borrows is operand size, QID, and from the encoding of the suffix instruction. If the suffix is a SIMD, it also borrows from the suffix the SIMD-width of the operation. The QID is always encoded in one of the source register specification fields of the suffix instruction. In SMI's particular implementation this is always bits 23:18, but this does not need to be the case.

SAD stands for 'SA-defused'
SAD is the parallel instruction to a LAD only for stores. It too prefetches data bringing in data to caches for modification. Further it creates a memory-store-queue entry. SAD primary has 2 primary uses:
a) as a prefetch, read for modification of data
b) to keep correct memory ordering and expose and handle potential write-after-read hazards after promoting a load (read) before a store (write)

SAD is a hint instruction. The SAD instruction calculates an effective memory address (from potentially a complex specification), specifies operand size (byte, half word, word, double word, . . . ); initiates memory reference; through TLB, cache/memory hierarchy. Exceptions (page walk miss), privilege, protection) are recorded at SAF+suffix execution to re-execute and it to take the exceptions.

The SAD instruction has the general format and operands:
SAD(os) M[ea],QID
Ea—is the effective address specification, which may be a combination of base-register, indexing register, shifting factors and/or indexing offset. E.g. M[B,RI,sf,offset]
 Os—is an indication of number of bytes to be written to the Ea
 QID—is the store memory QID to be used for the memory reference operation. It is also used to link the SAD's operation and an subsequent SAF prefixed instruction. The QID is in the range of 1 to N, N is an implementation specific value. Expected values are 31, 63, 127. The QID=0 is reserved for the special case of SAF instruction which have no antecedent SAD. This QID is always used immediately by the SAF.

SAF stands for 'SA-fused'
SAF is the parallel prefix to the LAF prefix, only for stores. As a prefix it must be directly coupled (or fused) with a suffix instruction. The suffix instruction can be stand alone. The suffix instruction can be any instruction that has at least one target register. The SAF as a prefix must be coupled. The SAF changes the nature of the suffix instruction: one or more of the destination register operands which is normally register-selection index into a memory store queue identifier (QID), and the operation from targeting a register to targeting a memory (more precisely a memory queue entry). As such it changes a register operation into a store memory operation.

The SAF instruction may or may not have an antecedent SAD. If the QID==0, then the SAF is without an antecedent SAD. If the QID !=0, then the SAF has or had an antecedent SAD. When the SAF/suffix executes if the QID==0, the 0 entry of the memory queue is used to do an 'SA' operation, memory write, stage data into the memory queue, and then completed by storing the data supplied by the suffix instruction source. On the other hand, if the QID!=0, then the memory queue is consulted (lookup) for a matching QID, if present the data will be written into the memory queue entry when the operation of the suffix instruction is applied. If the matching QID, is valid but not complete, the data is stalled until data is available. If the QID is not valid, then the SAF has sufficient enough information (address and data-operand-size) to restart the operation and complete the memory write operation. A matching QID may not be present for a variety of reasons, some of which are:

a) the antecedent SAD never executed, bad coding, or other reason.
b) the execution flow between SAF and the antecedent SAD was broken by exception or interrupt In any of these cases, the SAF prefix+suffix have sufficient information to repeat the SAD (SA) operation. This capability makes our SAD instruction into a hint. The SAD did not have to successfully execute or for that matter to be even be implemented beyond being a NOP for correct code to use it.

LASAF is an instruction prefix

LASAF as a prefix modifies an instruction that has a same register as a source and a destination. LASAF changes such an instruction into an atomic memory reference read/write once operation. One from the load-memory queue and one from the store memory queue are used. There is no antecedent LAD or SAD instruction.

LASAF M[ea3]
ADD QID1,QID2,R1

LASAF creates QID entries in both the load and store memory queue. And would them read memory[ea3] using QID2, add R1 and store the result in store memory QID1, effectuating an atomic read-modify write of M[ea3].

The SMI implementation (if we were to implement this) would require QID1==QID2==0. But we don't want to restrict ourselves to that implementation.

Could we have a LASAD instruction, I think so, but we'd have to snoop all the way into the memory queue's to do it. Invalidate both entries on a snoop on a hit. And then re-execute the load/store on the LASAF.

Example usage:

A. Saving Register Resource after Promoting a Load Far in Advance of a Use of the Data.

Assume the original code is.
LDR R1,M[ea1]
ADD32 Rt,R1,R2

To hide memory access latency we wish to promote in execution flow the LDR as early as possible above the usage of the R1 data (the ADD).

LDR R1,M[ea1]
many instructions
ADD32 Rt,R1,R2

One downside of doing this is it keeps the R1 register 'busy' waiting for data, and it can not be used for other purposes. The memory queue expands the pool of resources to hold data. So we covert the in LDR into a LAD and a subsequent LAD:

LAD QID,M[ea1]
. . . many instructions
LAF M[ea1]
ADD32 Rt,QID,R2

Since a load-queue entry QID is used R1, is freed to be used for other purposes.

Or load Rt with the difference of Rt-QID, or if QID not present then reload data from M[ea1] subtract R2 from it, and place result in Rt.

It should be noted that with the above described implementation it is not necessary for the memory address calculation to match between the 2 loads. If the two address calculations differ, and the QID is still valid there is most likely a bad programmer. The OS (in our example 32), also does not have to match between the LAD and LAF. More data than necessary may be read by the LAD, in which case the least-significant bytes of the data read will be used. Or more data may be required by the LAF+suffix than the LAD read, in which case the least-significant bytes read by the LAD will be used, followed by 0 until the suffix operation is sufficed. Further the address calculation operands do not have to match between the LAD and LAF, although for good coding they should get the same resultant effective address.

B. Saving Execution Cycles, by Morphing a Normal ALU Register-Register Operation into an ALU Register Memory Operation.

Here we are using the special QID=0 (%0) just to change the normal register-register ADD instruction into a memory reference. Since LAF is a prefix and must be directly coupled to the ADD, there is no instruction in between. The QID=0 is always available for usage, as it is immediately used.

LAF M[ea1]
ADD32 Rt,% q0,R2

LAF effectively changes the above instruction into
ADD32 Rt,M[ea1],R2

We can also use SAF to morph an ALU register-register operation into a operation that stores the result of the ALU operation into memory.

SAF M[ea1]
ADD % q0,R2,R3

Will store the result of adding R2 and R3 into memory at address ea1.

C. Preserving Order Semantic when Promoting Load Above Stores.

Another issue is that we want to promote the load (LDR) above a store (STR) which may or may not alias with the address of the load. Alias: some or all of the data address by ea1 is the same as ea2.

STR M[ea2]
LDR R1,M[ea1]
ADD32 Rt,R1,R2 becomes

LDR R1,M[ea1]
0-to-many instructions
STR M[ea2],R3
0-to-many instructions
ADD32 Rt,R1,R2

To safely do this safely (generate correct code), we need the tools to do it. Here we use both LAD and SAD instructions and their respective LAF and SAF prefix+suffix instructions, and to be able to preserve execution order and generate correct code.

LOOP:
SAD M[ea2],R3
0-to-many instructions
a)
LAD R1,M[ea1]
0-to-many instructions
b)
SAF M[ea1],R3
0-to-many instructions
c)
saf-suffix
LAF M[ea1]
d)
BRN LOOP In the above code both the LAD and the SAD have to be promoted and keep the same ordering. What can happen? At each point a, b, c, d an alternate is indicated.

a1) interrupt, invalidates the SAD, the subsequent SAF will have to re-execute
a2) LAD aliases with SAD, invalidates the LAD or rather wont be inserted into the memory queue
b1) interrupt, invalidated the SAD and LAD
b2) SAF aliases with the LAD, and invalidates the LAD
b3) SAF either uses the still valid SAD, or re-executes.
c1) interrupt, invalidates the LAD,
c2) if still valid LAF uses LAD's data, otherwise re-executes.
c3) loops, do to the magic of hardware, a combination of tagging with IP and execution sequence ID, and the QID, LAD/SAD/LAF/SAF are properly managed.

In the above described descriptions of LA/SA and LD/SD, the LA and SA relative program order positions are used to enforce order for forwarding purposes. In another embodiment, the LD/SD relative program order positions can be used to enforce order for forwarding purposes (e.g., as described below).

Figure 4:
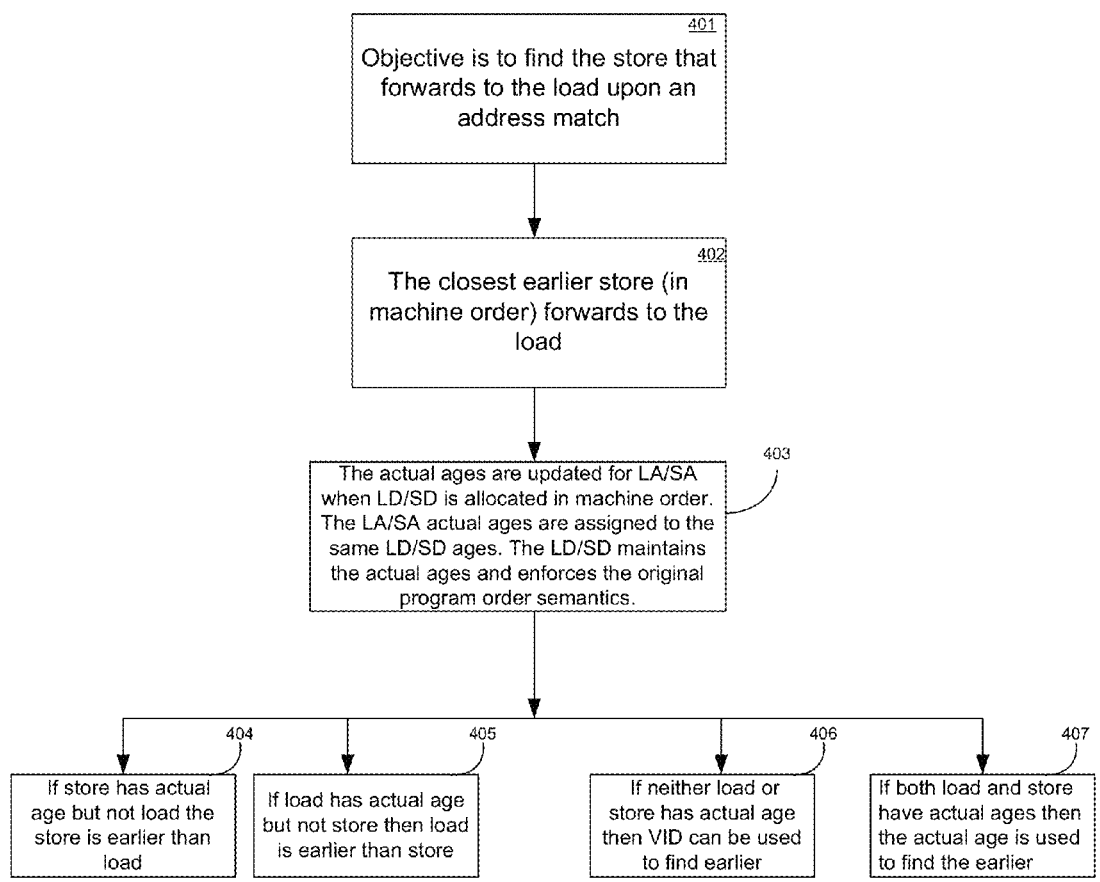
FIG. 4 shows a flowchart of the steps of a process where rules for implementing recovery from speculative forwarding miss-predictions/errors resulting from load store reordering and optimization are diagrammed in accordance with one embodiment of the present invention.

FIG. 4 shows a flowchart of the steps of a process 400 where rules for implementing recovery from speculative forwarding miss-predictions/errors resulting from load store reordering and optimization are diagrammed in accordance with one embodiment of the present invention.

As illustrated by step 401, an objective of embodiment of the present invention as to find stores that forward to a load upon an address match between that store and that load. In step 402, the closest earlier store (e.g., in machine order) forwards to the load.

In step 403, the actual ages are updated for LA/SA when LD/SD is allocated in machine order. The LA/SA actual ages are assigned the same value as the LD/SD ages. The LD/SD maintains the actual ages and enforces the original program order semantics.

Steps 404-407 show the rules for maintaining program sequential semantics while supporting speculative execution. The steps 404-407 are shown as being arranged horizontally with each other to indicate that the mechanisms that implement these rules function simultaneously. As shown in step 404, if a store has an actual age but the load has not yet obtained an actual age, then the store is earlier than the load. As shown in step 405, if a load has an actual age but the store has not yet obtained an actual age, then the load is earlier than the store. As shown in step 406, if either the load or the store has obtained an actual age, then a virtual identifier (VID) will be used to find out which is earlier (e.g., in some embodiments the QID that is associated with the load/store instructions represents the VID). As shown in step 407, if both a load and a store have obtained actual ages, then the actual age is used to find out which is the earlier.

It should be noted that algorithm described by the FIG. 4 embodiment used to determine the relative age between a load and a store can also be used to determine the relative age among a plurality of stores. This is useful in updating the store age stamp as described below in FIG. 4 and subsequent figures.

Figure 5:
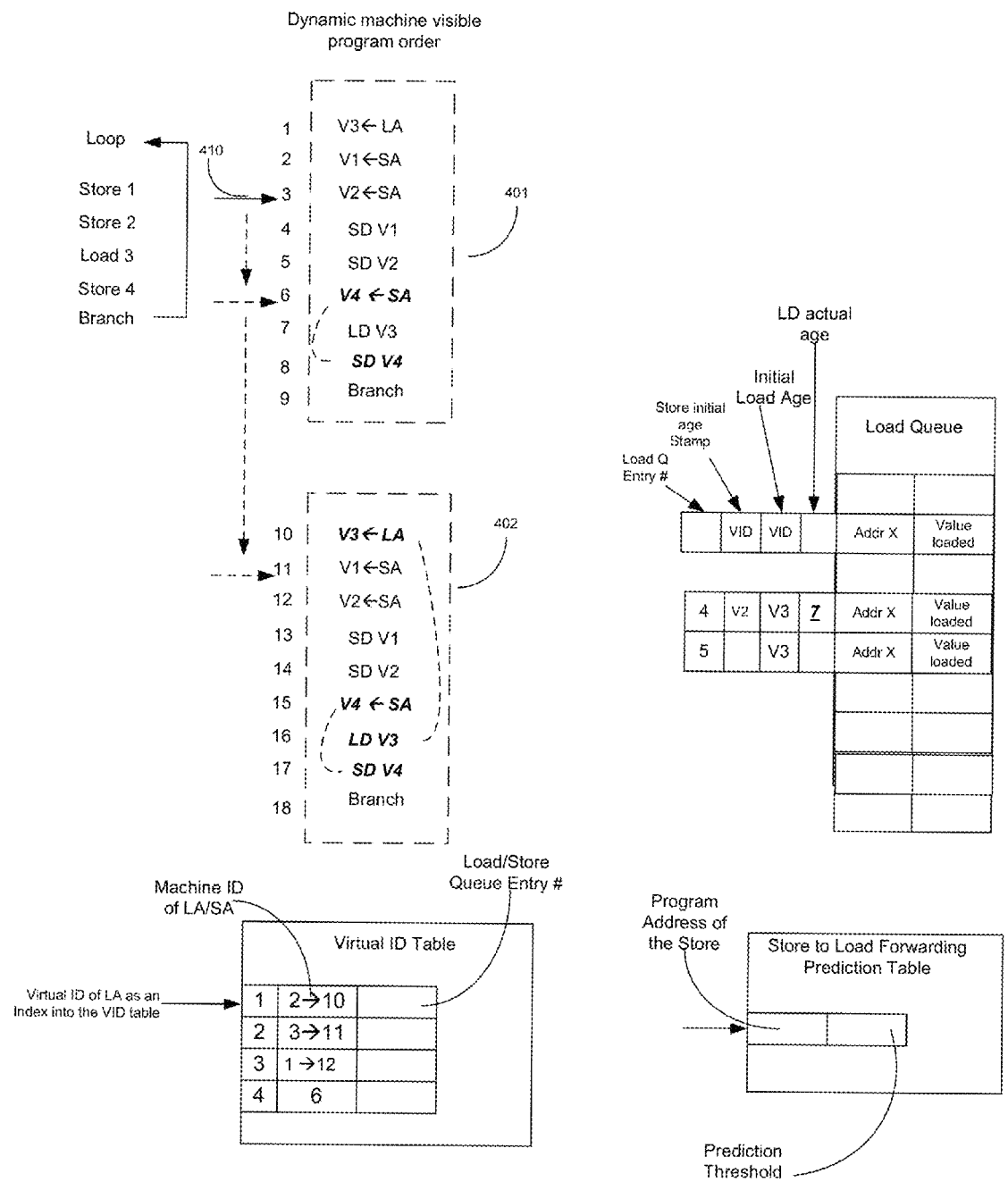
FIG. 5 shows a diagram illustrating the manner in which the rules of process 300 are implemented with the load queue and store queue resources of a processor in accordance with one embodiment of the present invention.

FIG. 5 shows a diagram illustrating the manner in which the rules of process 400 are implemented with the load queue and store queue resources of a processor in accordance with one embodiment of the present invention. The FIG. 5 embodiment shows an example where a loop of instructions has been unrolled into two identical instruction sequences 401-402. It should be noted that the SA and LA can be freely reordered, however, the SD and LD have to maintain their relative program order. Earlier stores can forward to later loads. Earlier means smaller VID (e.g., as maintained in the virtual ID table) or smaller age. If an SA has a VID but no age that SA is later than a load that has an age. Actual age of LA/SA gets updated at the allocation of LD/SD and assigned the same age of the LD/SD. If a store or a load has an actual age, it compares with the actual age, else VID age is used.

It should be noted that the VID table functions by keeping track of the associations between the LA/SA and LD/SD instructions by storing the LA/SA corresponding machine ID and machine resources that correspond to each VID unique identifier. It should also be noted that the term "VID" is synonymous with the term "QID" as described in the discussion of FIG. 2A and FIG. 2B.

An example of operation of the FIG. 4 embodiment is now described. Initially, consider a case where the allocation pointer 410 was initially at 3. V3 LA has been dispatched and allocated in the load Q entry #4. Both V1 SA and V2 SA have been dispatched. They compare with V3 LA and because V2 SA is smaller than V3 LA and closer to it than V1 SA, then it is potentially forwarding to V3 LA, and thus it updates the store initial age for the V3 LA load Q entry.

The allocation pointer now moves to 6. The store actual age of V2 SA (#5) now updates the V3 LA load Q entry (because V2 SA is the store of record that has stamped to forward to this load). V4 SA now dispatches and compares with the load initial age, and because V4 is larger than V3 LA, it does not forward. Allocation pointer now moves to 11. At the time of allocation of V3 LD, it updates the load Q entry #4 with the actual age of V3 LD (#7). V1 SA #11 is now dispatched. Since V3 LA #1 now has an actual age but not V1 SA #11, then the load is earlier than the store, and thus no forwarding is possible.

The prediction table is for detecting cases where the default assumption has been incorrect. The default assumption is that no store forwards to a load. Once forwarding is detected for a load store pair the program counter of the load store pair is recorded so that the load will always wait for that store address to be dispatched and address calculated to find out if that load address matches that store address and thus needs to forward from it.

It should be noted that in one embodiment, the feature described herein, wherein the LD/SD is allowed to dispatch in absence of the LA/SA, facilitates reordering of LA/SA ahead of a branch or within a branch scope in a given sequence of instructions. If the LA and SA were skipped over as a result of a branch, or they were ignored as a result of having caused a memory exception, the LD and SD can still function correctly because they include the necessary information to dispatch twice: first as an LA/SA, and second as an LD/SD. In such case, the first dispatch of the LD/SD is performing the address calculation (e.g., load address). Subsequently, the same LD/SD can dispatch again to fulfill the consuming part of the load or store (e.g., load data). This mechanism can be referred to as a "dual dispatch" of the load and store instructions.

It should be noted that, in one embodiment, the dual dispatch of the LD/SD happens when the corresponding defused LA/SA is non-existent (e.g., as is the case with a fused LD/SD), or if the LA/SA was skipped over as a result of a branch, or they were ignored as a result of having caused a memory exception, or the like.

The above described dual dispatch functionality ensures LD/SD executes correctly independent of the lost, ignored or skipped LA/SA. The benefit provided by the above described feature is that prefetching of the data specified by the load/store can start earlier in the program order (e.g., reducing latency) by scheduling the LA/SA earlier, even in the presence of branches, potential faults, exceptions, or the like.

Figure 6:
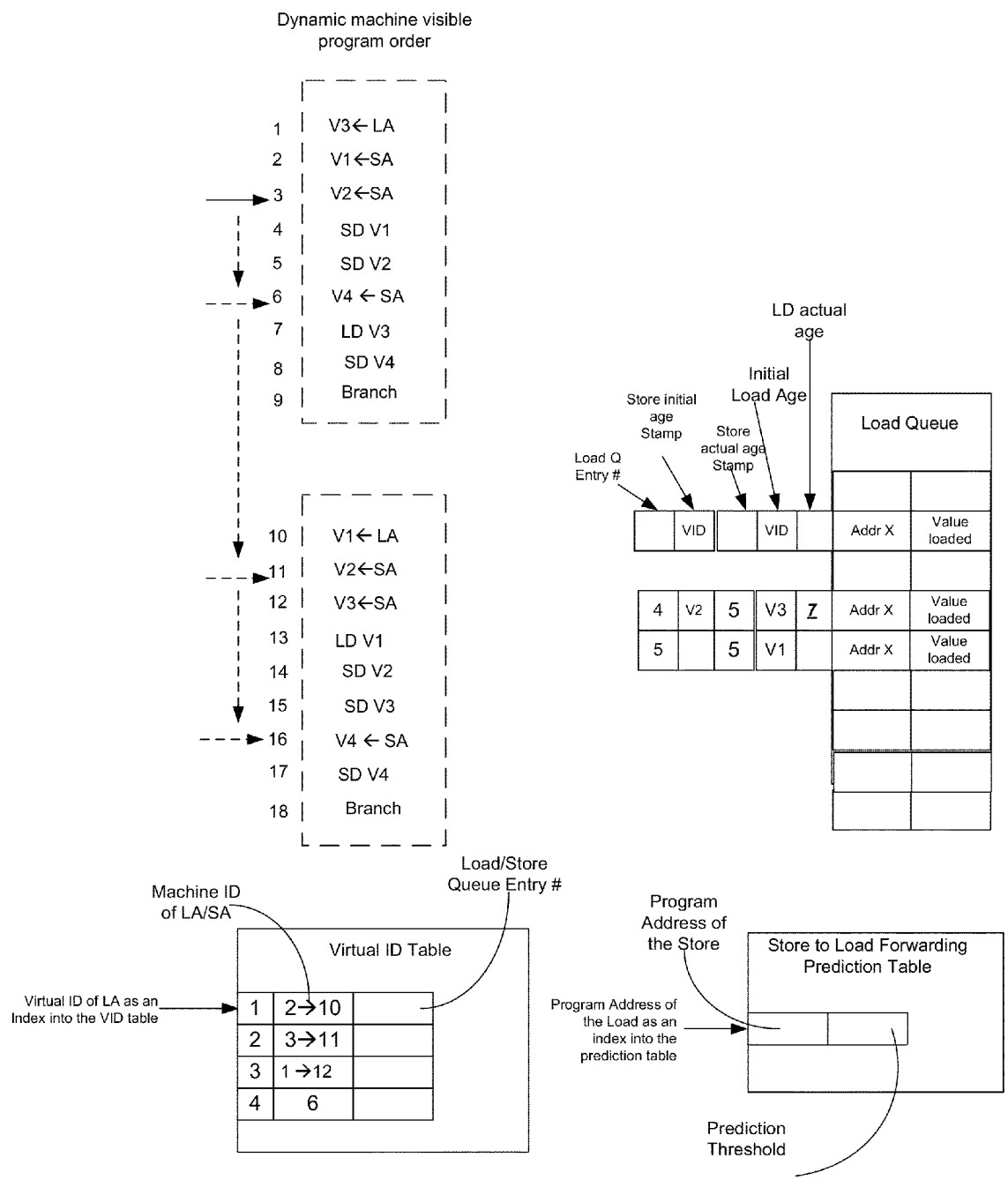
FIG. 6 shows another diagram illustrating the manner in which the rules of process 300 are implemented with the load queue and store queue resources of a processor in accordance with one embodiment of the present invention.

FIG. 6 shows another diagram illustrating the manner in which the rules of process 400 are implemented with the load queue and store queue resources of a processor in accordance with one embodiment of the present invention. In the FIG. 6 embodiment, consider a case where the allocation pointer was initially at 3. V3 LA has been dispatched and allocated in the load Q entry #4. The allocation pointer now moves to 6. The store actual age of V1 and V2 (#4, #5) now updates the corresponding SA's with machine ID 2 and 3. V4 SA now dispatches and compares with the load initial age, and because V4 SA is larger than V3 LA, it does not forward. The allocation pointer now moves to 11. At the time of allocation of V3 LD, it updates the load Q entry #4 with the actual age of V3 LD (#7). Now V1 LA of ID 10 is now dispatched.

Both V1 SA of machine ID 2 and V2 SA of machine ID 3 are now dispatched. They compare with V1 LA of ID 10 and because V1 LA of ID 10 has no machine age (its corresponding LD has not been allocated yet), while both V1 SA of machine ID 2 and V2 SA of machine ID 3 have actual age, then it is known that both V1 and V2 stores are earlier/older than V1. Then the latest of these two stores (V2) can forward to V1 of ID 10. SA (V2) #11 is now dispatched. Since V1 LA and V2 SA do not have an actual age, their VID's are used for comparison, and no forwarding is detected. The allocation pointer now moves to 16. V4 SA of ID 16 is now dispatched and it compares with V1 LA of ID 10 and since the V1 LA has an actual age but the V4 SA does not, then the V4 SA is later than the V1 LA. Thus no forwarding from this store to this earlier load is possible.

Figure 7:
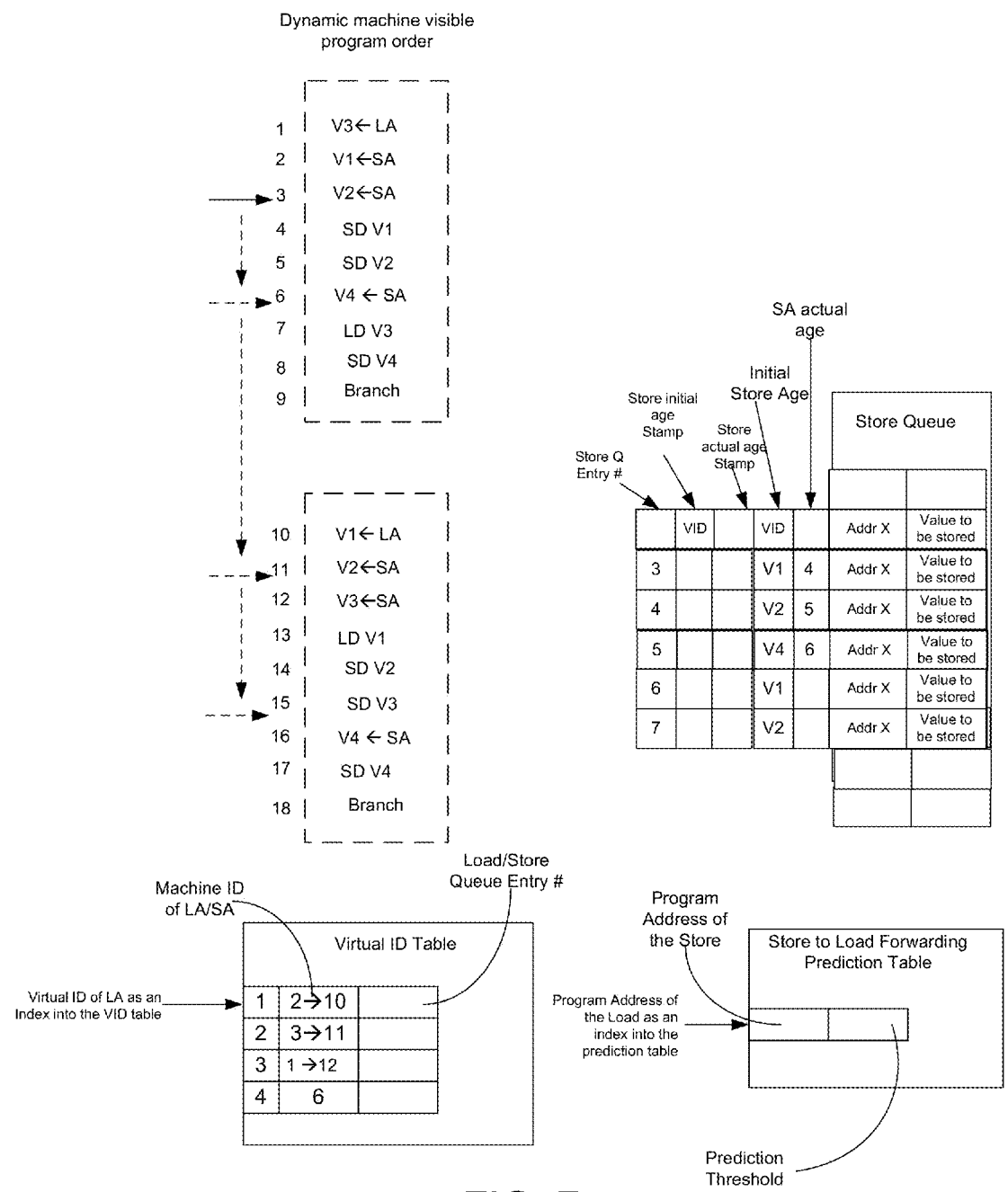
FIG. 7 shows another diagram illustrating the manner in which the rules of process 300 are implemented with the load queue and store queue resources of a processor in accordance with one embodiment of the present invention.

FIG. 7 shows another diagram illustrating the manner in which the rules of process 400 are implemented with the load queue and store queue resources of a processor in accordance with one embodiment of the present invention. In Figure the 7 embodiment, consider a case where the allocation pointer was initially at 3. V1 SA and V2 SA have been dispatched and allocated in the store Q entry #4 and #5. The allocation pointer now moves to 6 and V4 SA is dispatched. Both V1 SA and V2 SA get their actual age of 4 and 5.

The allocation pointer now moves to 11. V3 LA gets the actual age of 7. V1 SA #10 V2 SA #11 are dispatched. V3 LA is dispatched and it compares its address with the store Q entries and finds a match across V1 SA, V2 SA and V4 SA and V2 SA #11. Since V3 LA has its actual age of 7, it compares its actual age with the closest store age to it, which is age 5, belonging to V2 SA, and thus that load will forward from this store and be marked such in the load Q.

Figure 8:
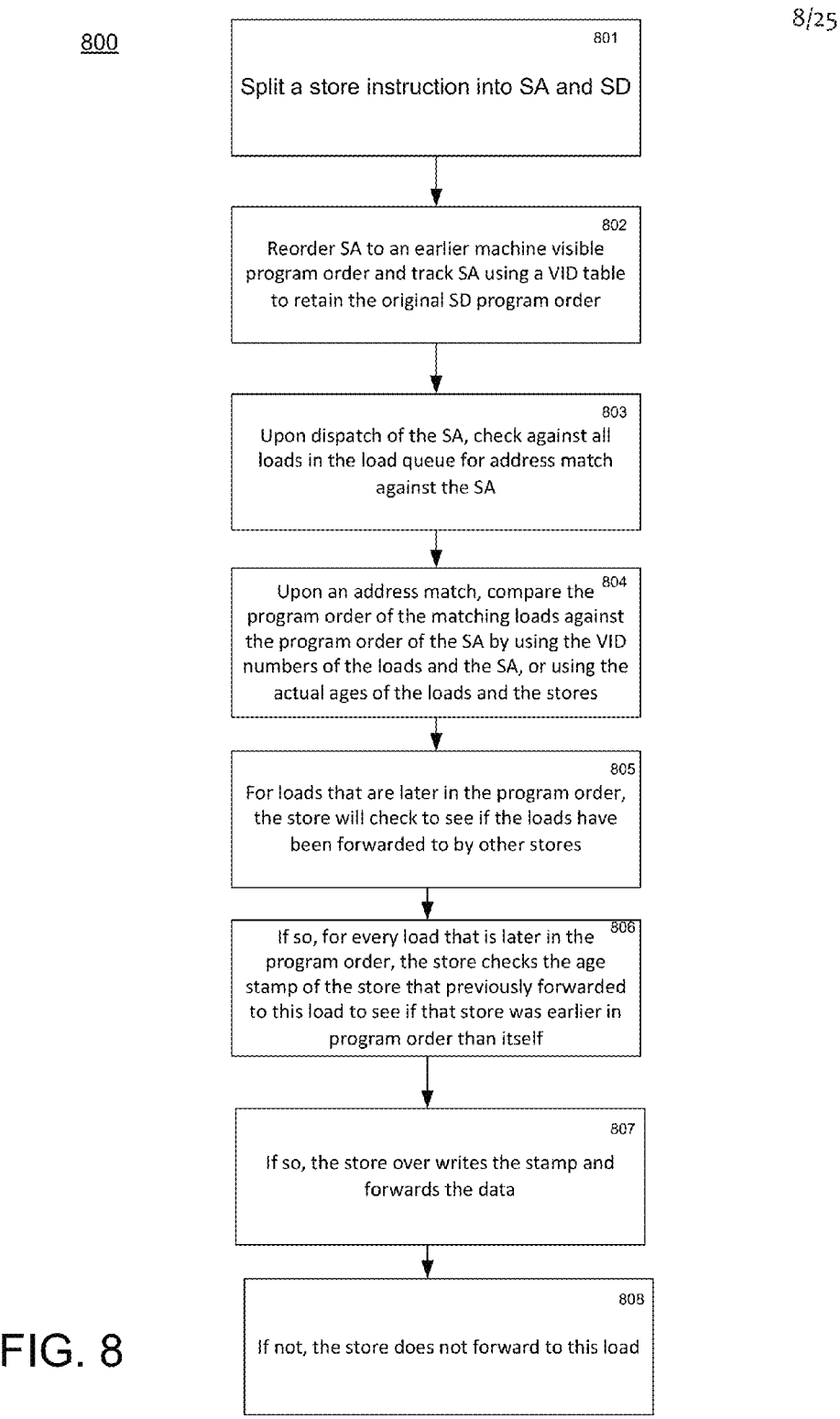
FIG. 8 shows a flowchart of a process of an overview of the dispatch functionality where a store is dispatched after a load in accordance with one embodiment of the present invention.

FIG. 8 shows a flowchart of a process 800 of an overview of the dispatch functionality where a store is dispatched after a load in accordance with one embodiment of the present invention.

Process 800 begins in step 801, where a store instruction is split into an SA and SD. As described earlier, the SA instruction maintains semantics with the SD instruction to allow dual dispatch in the event that there is no match in the VID table between the split SA and the just allocated SD. In step 802, SA is reordered to an earlier machine visible program order and that SA is tracked using a VID table to retain the original SD program order. In step 803, upon dispatch of the SA, a check is made against all loads in the load queue for address match against the SA.

In step 804, upon an address match, the program order of the matching loads is compared against the program order of the SA by using the VID numbers of the loads and the SA, or using the actual ages of the loads and the stores. This is the process that was diagrammed earlier in the discussion of the FIG. 3. If a store has an actual age but not load then the store is earlier than the load. If a load has an actual age but not the store then the load is earlier than the store. If either a load or a store has an actual age, then a virtual identifier (VID) can be used to find out which is earlier. If both a load and a store have actual ages then the actual age is used to find out which is the earlier. As described above, the VID number allows the tracking of original program order and the reordered SA and LA. The entries in the VID table allows the corresponding SD and LD to get associated with the machine resources that were assigned to the SA and LA when they were allocated.

In step 805, for loads that are later in the program order, the store will check to see if the loads have been forwarded to by other stores. In step 806, if so, the store checks a stamp of the store that previously forwarded to this load to see if that store was earlier in program order than itself. In step 807, if so, the store checks a stamp of the store that previously forwarded to this load to see if that store was earlier in program order than itself. In step 808, if not, the store does not forward to this load.

Figure 9:
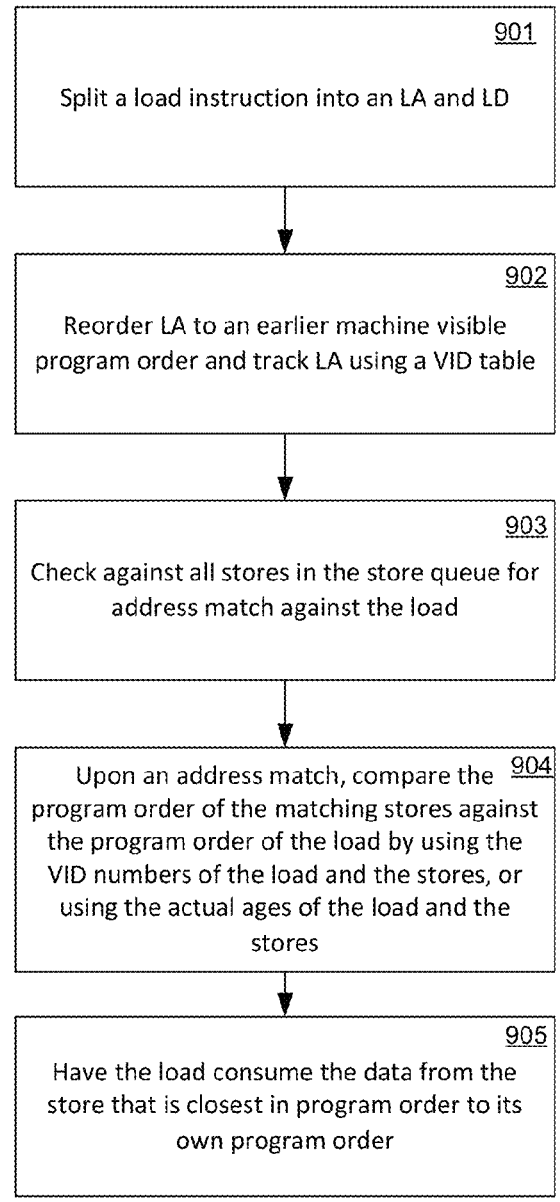
FIG. 9 shows a flowchart of a process of an overview of the dispatch functionality where a load is dispatched after a store in accordance with one embodiment of the present invention.

FIG. 9 shows a flowchart of a process 900 of an overview of the dispatch functionality where a load is dispatched after a store in accordance with one embodiment of the present invention.

In step 901, a load instruction is split into an LA and LD in the manner described above. In step 902, the LA is reordered to an earlier machine visible program order and is tracked using the VID table as described above. Instead 903, the LA is checked against all stores in the store queue for address match against the load.

In 904, upon an address match, compare the program order of the matching load against the program order of the store by using the VID numbers of the load and the store, or using the actual ages of the load and the store. This is the process that was diagrammed earlier in the discussion of the FIG. 3. If a store has an actual age but not load then the store is earlier than the load. If a load has an actual age but not the store then the load is earlier than the store. If either a load or a store has an actual age, then a virtual identifier (VID) can be used to find out which is earlier. If both a load and a store have actual ages then the actual age is used to find out which is the earlier. As described above, the VID number allows the tracking of original program order and the reordered SA and LA. Subsequently, in step 905, the load consumes the data from the store that is closest in program order to its own program order.

Figure 10:
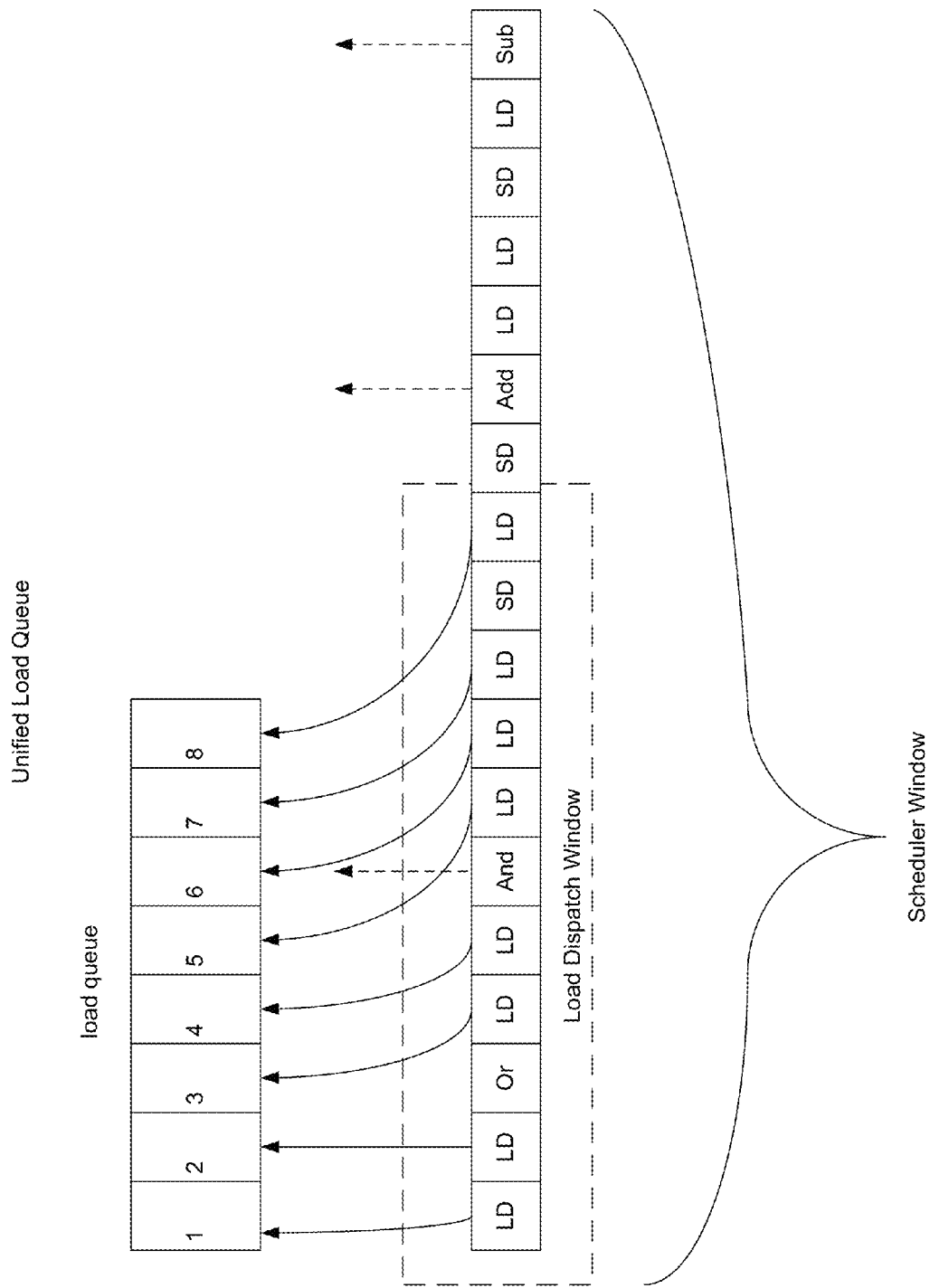
FIG. 10 shows a diagram of a unified load queue in accordance with one embodiment of the present invention.

FIG. 10 shows a diagram of a unified load queue in accordance with one embodiment of the present invention. An objective of a virtual load/store queue is to allow the processor to allocate in the machine more loads/stores than can be accommodated using the actual physical size of its load/store queue. In return, this allows the processor to allocate other instructions besides loads/stores beyond the processor's physical size limitation of its' load/store queue. These other instructions can still be dispatched and executed even if some of the loads/stores still do not have spaces in the load/store queues.

As loads retire out of the load queue, the load dispatch window moves to subsequent instructions in the sequence and will include more allocated loads to be considered for dispatch equivalent to the number of loads that have retired from the load queue. In this diagram, the load dispatch window will move from left to right.

In one embodiment, the load dispatch window will always include the number of loads that equal the number of entries in the load queue. No loads at any time can be dispatched outside the load dispatch window. Other instructions in the scheduler window besides loads (e.g., Sub, Add etc.) can dispatch. All loads within the load dispatch window can dispatch whenever they are ready.

Figure 11:
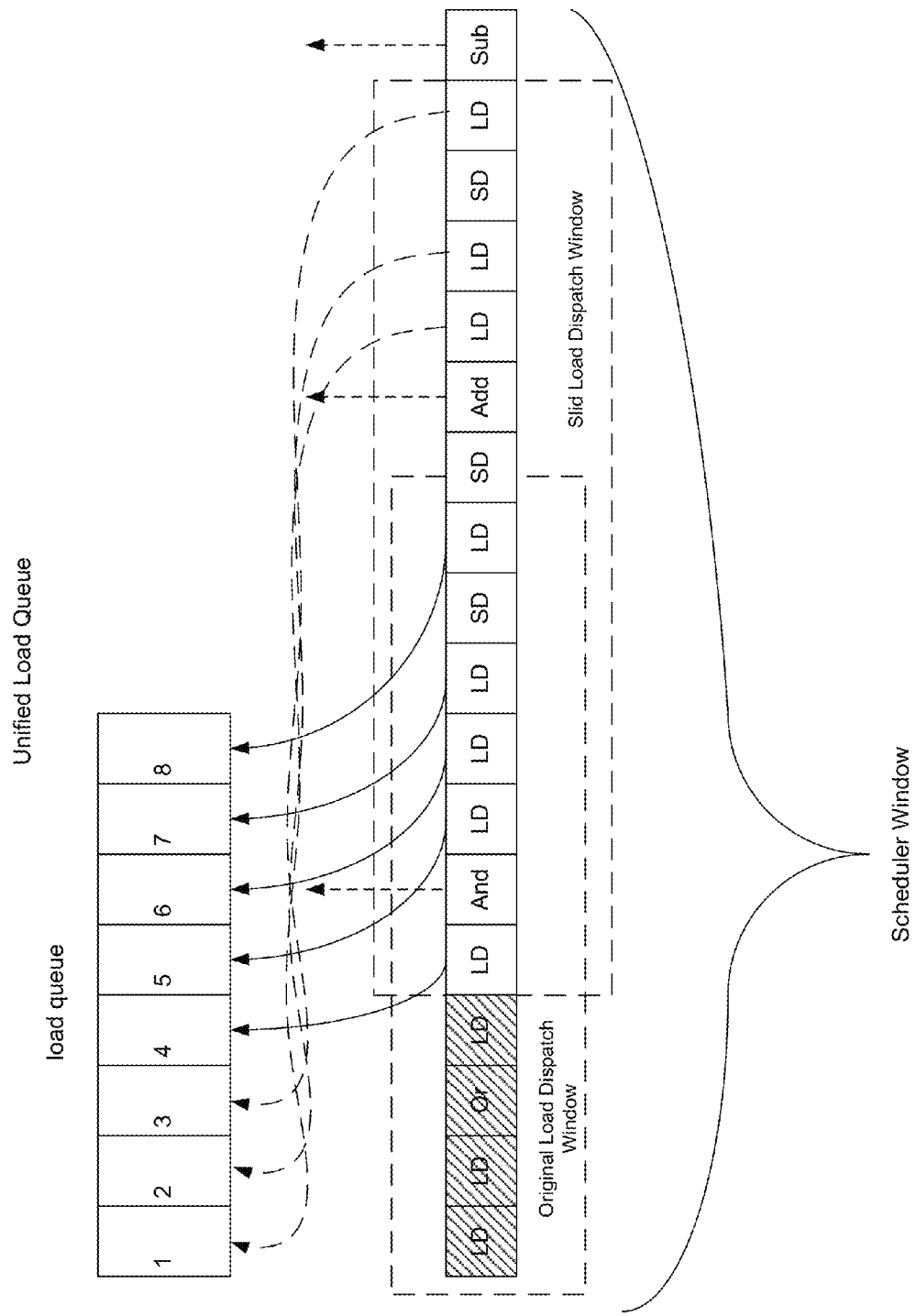
FIG. 11 shows a unified load queue showing the sliding load dispatch window in accordance with one embodiment of the present invention.

FIG. 11 shows a unified load queue showing the sliding load dispatch window in accordance with one embodiment of the present invention. FIG. 11 shows a subsequent instance in time in comparison to FIG. 10. As loads retire out of the load queue, the load dispatch window moves to subsequent instructions in the sequence and will include more allocated loads to be considered for dispatch equivalent to the number of loads that have retired from the load queue. The load dispatch window will always include the number of loads that equal the number of entries in the load queue. No loads at any time can be dispatched outside the load dispatch window. Other instructions in the scheduler window besides loads (e.g., Sub, Add etc.) can dispatch. All loads within the load dispatch window can dispatch whenever they are ready. Thus, one benefit obtained by this scheme is that allocating into the scheduler is not stalled if the load or the store queues capacity is exceeded, instead we continue allocating instructions intro scheduler including loads and stores in spite of the load or store queue capacity being exceeded, the load and store dynamic windows will insure no load or store outside the capacity of the load or store queue will be dispatched.

Figure 12:
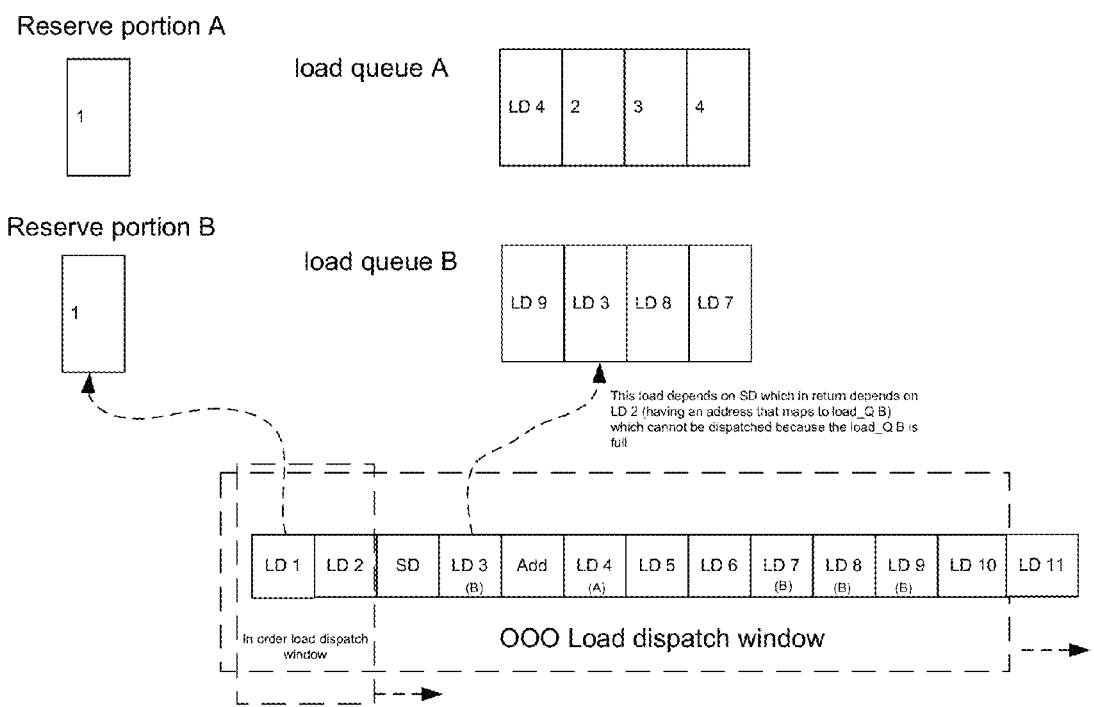
FIG. 12 shows a distributed load queue in accordance with one embodiment of the present invention.

FIG. 12 shows a distributed load queue in accordance with one embodiment of the present invention. An objective of the FIG. 12 embodiment is to implement a distributed load queue and a distributed store queue that maintains single program/thread sequential semantics but still allows the out of order dispatch of loads and stores across multiple cores/memory fragments.

The FIG. 12 diagram shows a load queue extension solution to avoid deadlocks. An extension of the load/store queue is created and is used to allocate deadlocked loads/stores to that extension queue in program order from the point of the load/store that caused the deadlock (from that point onward) until the load/store queue has free entries available. In the FIG. 12 scenario, the LD 3 load depends on SD which in return depends on LD 2 (having an address that maps to load_Q B) which cannot be dispatched because the load_Q B is full. In this deadlock scenario, upon detection of the deadlock, LD 1 and LD 2 are allowed to dispatch and retire in order one after the other into the reserve portion B. A conservative policy for a distributed load/store queue is to reserve for each load/store an entry in each load/store distributed queue. In this Figure, each allocated load needs to reserve an entry in load_Q A and another entry in load_Q B.

It should be noted that in distributed load/store queues, there is a problem with respect to allocated load/stores in that their address is unknown at allocation time. Because of this, it is only known at out of order dispatch time which of the distributed queues a given load or store will occupy.

Embodiments of the present invention can employ three different solutions for the distributed load/store queue to avoid deadlocks with out of order dispatches:

1. Cause a miss-prediction and flush at the earliest load/store that deadlocked (have no space to dispatch to the load/store buffer) and start dispatching load/stores either in order for a period of time, or by conservative allocation where each load/store allocates space in all distributed queues. Once the address of that load/store is known (at dispatch time) thus the particular load queue which will receive that load/store is known, it can de-allocate the reserved spaces in the other queues.

2. An extension of the load/store queue is created and is used to allocate deadlocked loads/stores to that extension queue in program order from the point of the load/store that caused the deadlock (FIG. 9).

3. Dynamic dispatch window sizing, where the sum of the un-dispatched loads outside the continuity window should be less than or equal to the number of free unreserved spaces in that particular load queue (e.g., FIG. 11).

Figure 13:
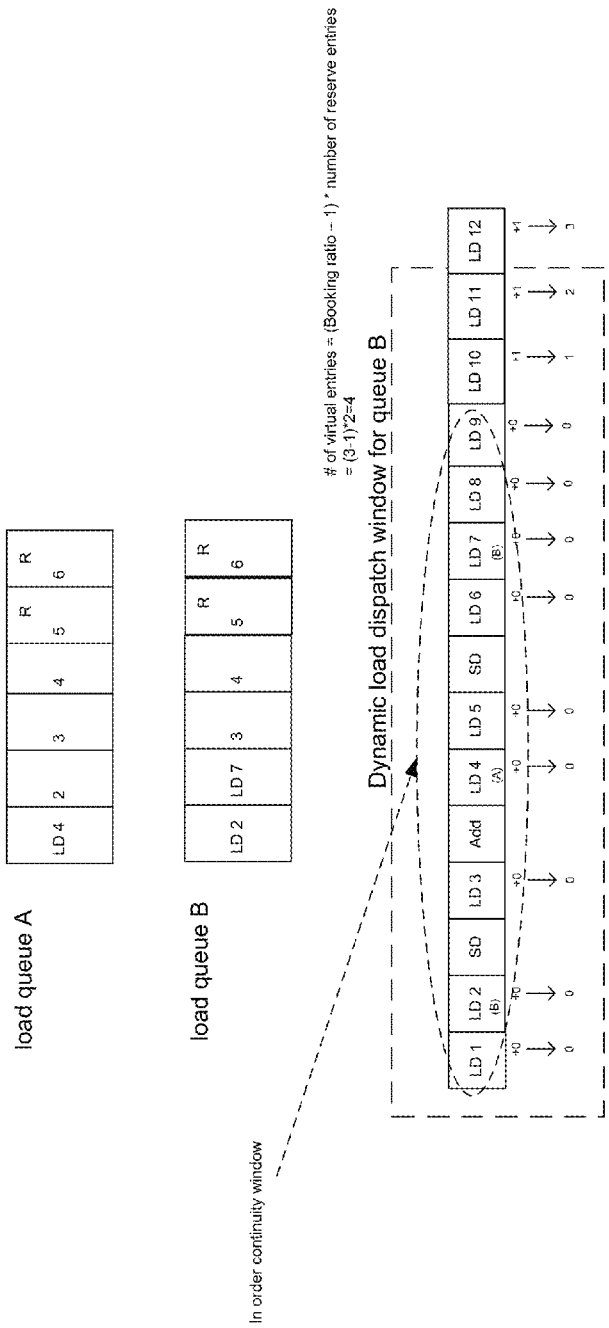
FIG. 13 shows a distributed load queue having an in order continuity window in accordance with one embodiment of the present invention.

FIG. 13 shows a distributed load queue having an in order continuity window in accordance with one embodiment of the present invention. Dynamic load dispatch window sizing is determined such that the sum of the un-dispatched loads outside the continuity window should be less than or equal to the number of free unreserved spaces in that particular load queue. Each load queue will track its entries using its respective dispatch window as shown here. The dynamic window size for each load queue at any time=physical size of that queue plus the virtual entries (in this case 6+4=10) thus in this case, the window size should only cover 10 loads. Note loads for other queues are not counted (e.g., LD 4).

Booking ratio of the reserve is 3. The booking ratio is the number of in order loads that compete for each of the reserved spaces. In this example, only the first two in order un-dispatched loads (scanning the in-order continuity window from the left to right) can dispatch to the reserve portion (assuming 2 entries of the queue were assigned to reserve). Hence, the number of virtual entries=(Booking ratio−1) *number of reserve entries=(3−1)*2=4.

With respect to the in order continuity window sizing, the number of loads at any time (counting from the oldest to the youngest) that have not dispatched to an entry (captured space) in the load queues plus the number of dispatched loads to the reserve space must be less than or equal to (the booking ratio*the number of reserve entries). In this case, the number of loads must be less than or equal to 3. The booking ratio is a design configurable performance metric that determines what is the accepted (occupancy VS booking) ratio of the reserved space. This is exercised in case the earliest un-dispatched loads cannot find a queue space to dispatch to outside the reserved entries. In such case, those loads starting from the earliest (oldest) load will compete for the reserved space, the booking ratio determines how many loads will wait to occupy each reserved entry, the reserved entries are always assigned first to the oldest un-dispatched load and once that load retires the next oldest load can occupy the entry (the booking ratio determines the number of those loads that occupy the reserved entries one after the other starting from the oldest dispatched).

It should be noted that in one embodiment, loads from the in order continuity window of each queue can dispatch to the reserved space of that queue when there is no space left in the unreserved portion of that queue (starting from the oldest load in order). It should be also noted that in one embodiment, loads outside the in order continuity window of either queue and within the dynamic dispatch window of that queue cannot dispatch to the reserved portion of that queue.

It should be noted also that as long as there is space in the unreserved portion of the queue, any load within the whole dynamic dispatch window of that queue can dispatch out of order to any entry of the unreserved portion of any of the distributed queues. The sizes of both the in order continuity window and the dynamic dispatch window of either queue is adjusted each cycle to reflect their size limitations stated in the equations provided above after each load dispatch or retirement.

Figure 14:
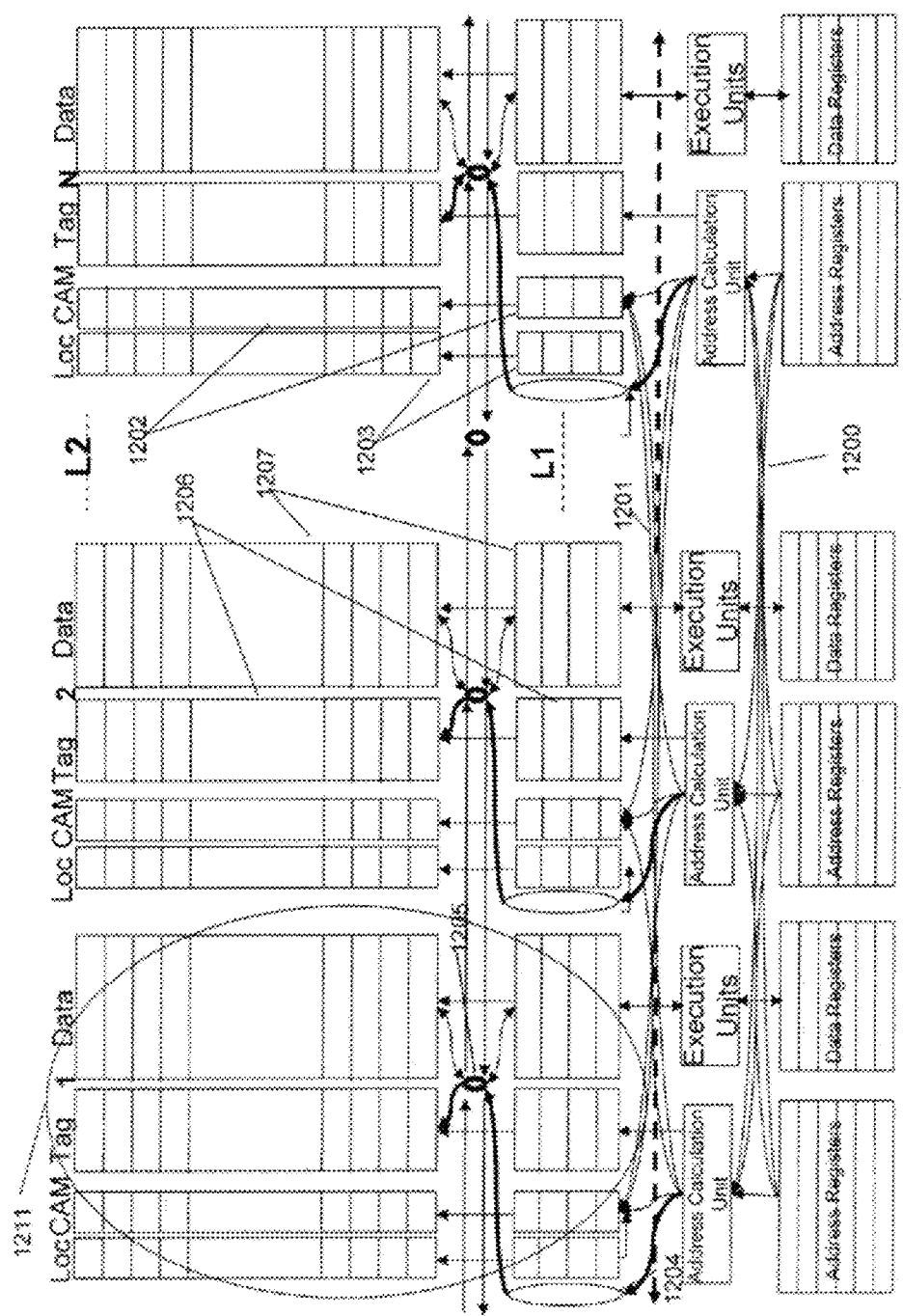
FIG. 14 shows a diagram of a fragmented memory subsystem for a multicore processor in accordance with one embodiment of the present invention.
Figure 15:
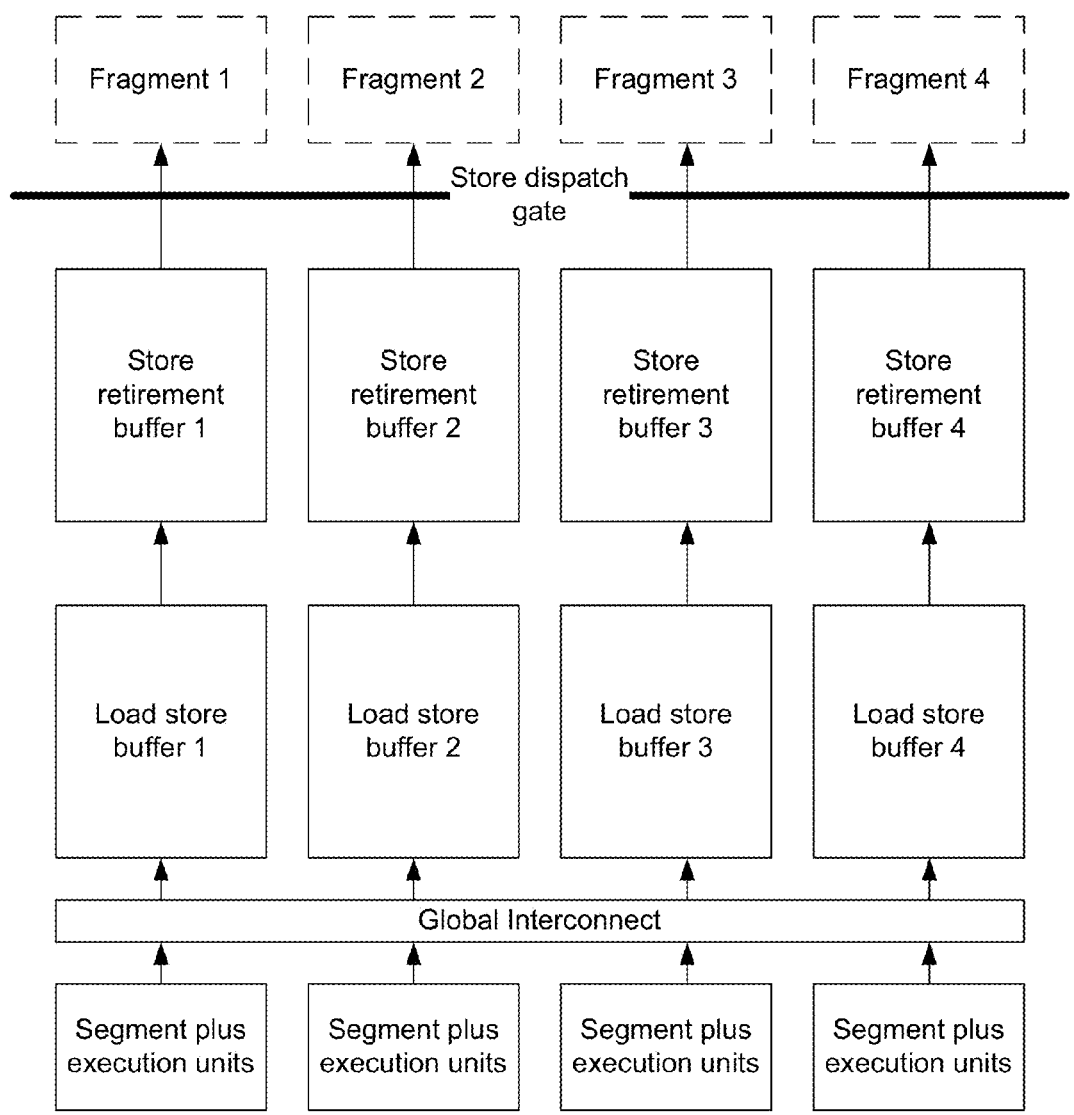
FIG. 15 shows a diagram of how loads and stores are handled by embodiments of the present invention.

FIG. 14 shows a diagram of a fragmented memory subsystem for a multicore processor in accordance with one embodiment of the present invention. FIG. 13 shows a comprehensive scheme and implementation of the synchronization scheme among threads and/or among loads and stores in general. The scheme describes a preferred method for synchronization and disambiguation of memory references across load/store architectures and/or across memory references and/or threads' memory accesses. In FIG. 15, multiple segments of register files (address and or data registers) are shown, along with execution units, address calculation units, and fragment s of level 1 caches and/or load store buffers and level 2 caches and address register interconnects 1200 and address calculation unit interconnects 1201. Those fragmented elements could be constructed within one core/processor by fragmenting and distributing its centralized resources into several engines or they can be constructed from elements of different cores/processors in multi-core/multi-processor configurations. One of those fragments 1211 is shown in the figure as fragment number 1; the fragments can be scaled to a large number (in general to N fragments as shown in the figure).

This mechanism also serves also as a coherency scheme for the memory architecture among those engines/cores/processors. This scheme starts by an address request from one of the address calculation units in one fragment/core/processor. For example, assume the address is requested by fragment 1 (e.g., 1211). It can obtain and calculate its address using address registers that belong to its own fragment and or from registers across other fragments using the address interconnect bus 1200. After calculating the address it creates the reference address of either 32-bit address or 64-bit address that is used to access caches and memory. This address is usually fragmented into a tag field and a set and line fields. This particular fragment/engine/core will store the address into its load store buffer and/or L1 and/or L2 address arrays 1202, at the same time it will create a compressed version of the tag (with smaller number of bits than the original tag field of the address) by using a compression technique.

Moreover, the different fragments/engines/cores/processors will use the set field or a subset of the set field as an index to identify which fragment/core/processor the address is maintained in. This indexing of the fragments by the address set field bits ensures exclusiveness of ownership of the address in a particular fragment/core/engine even though the memory data that corresponds to that address can live in another or multiple other fragments/engines/cores/processors. Even though the address CAM/tag arrays 1202/1206 are shown in each fragment to be coupled with the data arrays 1207, they might be only coupled in physical proximity of placement and layout or even by the fact that both belongs to a particular engine/core/processor, but there is no relation between addresses kept in the address arrays and the data in the data arrays inside one fragment.

FIG. 15 shows a diagram of how loads and stores are handled by embodiments of the present invention. As depicted in FIG. 15, each fragment is associated with its load store buffer and store retirement buffer. For any given fragment, loads and stores that designate an address range associated with that fragment or another fragment are sent to that fragment's load store buffer for processing. It should be noted that they may arrive out of order as the cores execute instructions out of order. Within each core, the core has access to not only its own register file but each of the other cores' register files.

Embodiments of the present invention implement a distributed load store ordering system. The system is distributed across multiple fragments. Within a fragment, local data dependency checking is performed by that fragment. This is because the fragment only loads and stores within the store retirement buffer of that particular fragment. This limits the need of having to look to other fragments to maintain data coherency. In this manner, data dependencies within a fragment are locally enforced.

With respect to data consistency, the store dispatch gate enforces store retirement in accordance with strict in-program order memory consistency rules. Stores arrive out of order at the load store buffers. Loads arrive out of order also at the load store buffers. Concurrently, the out of order loads and stores are forwarded to the store retirement buffers for processing. It should be noted that although stores are retired in order within a given fragment, as they go to the store dispatch gate they can be out of order from the multiple fragments. The store dispatch gate enforces a policy that ensures that even though stores may reside across store retirement buffers out of order, and even though the buffers may forward stores to the store dispatch gate out of order with respect to other buffers' stores, the dispatch gate ensures that they are forwarded to fragment memory strictly in order. This is because the store dispatch gate has a global view of stores retiring, and only allows stores to leave to the global visible side of the memory in order across all the fragments, e.g., globally. In this manner, the store dispatch gate functions as a global observer to ensure that stores ultimately return to memory in order, across all fragments.

Figure 16:
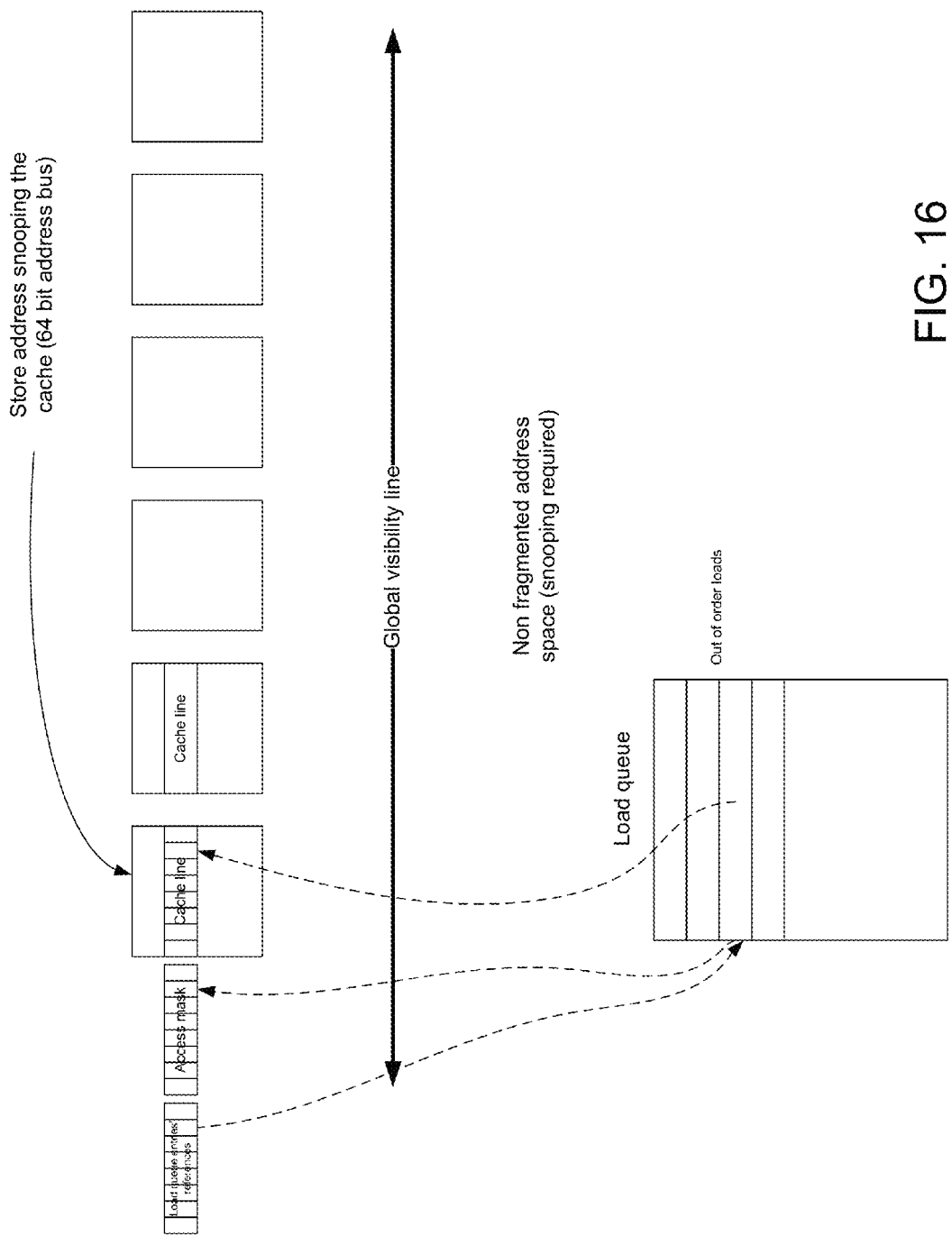
FIG. 16 shows a diagram of a store filtering algorithm in accordance with one embodiment of the present invention.

FIG. 16 shows a diagram of a store filtering algorithm in accordance with one embodiment of the present invention. An objective of the FIG. 16 embodiment is to filter the stores to prevent all stores from having to check against all entries in the load queue.

Stores snoop the caches for address matches to maintain coherency. If thread/core X load reads from a cache line, it marks the portion of the cache line from which it loaded data. Upon another thread/core Y store snooping the caches, if any such store overlaps that cache line portion, a misspredict is caused for that load of thread/core X.

One solution for filtering these snoops is to track the load queue entries' references. In this case stores do not need to snoop the load queue. If the store has a match with the access mask, that load queue entry as obtained from the reference tracker will cause that load entry to miss predict.

In another solution (where there is no reference tracker), if the store has a match with the access mask, that store address will snoop the load queue entries and will cause the matched load entry to miss predict.

With both solutions, once a load is reading from a cache line, it sets the respective access mask bit. When that load retires, it resets that bit.

Figure 17:
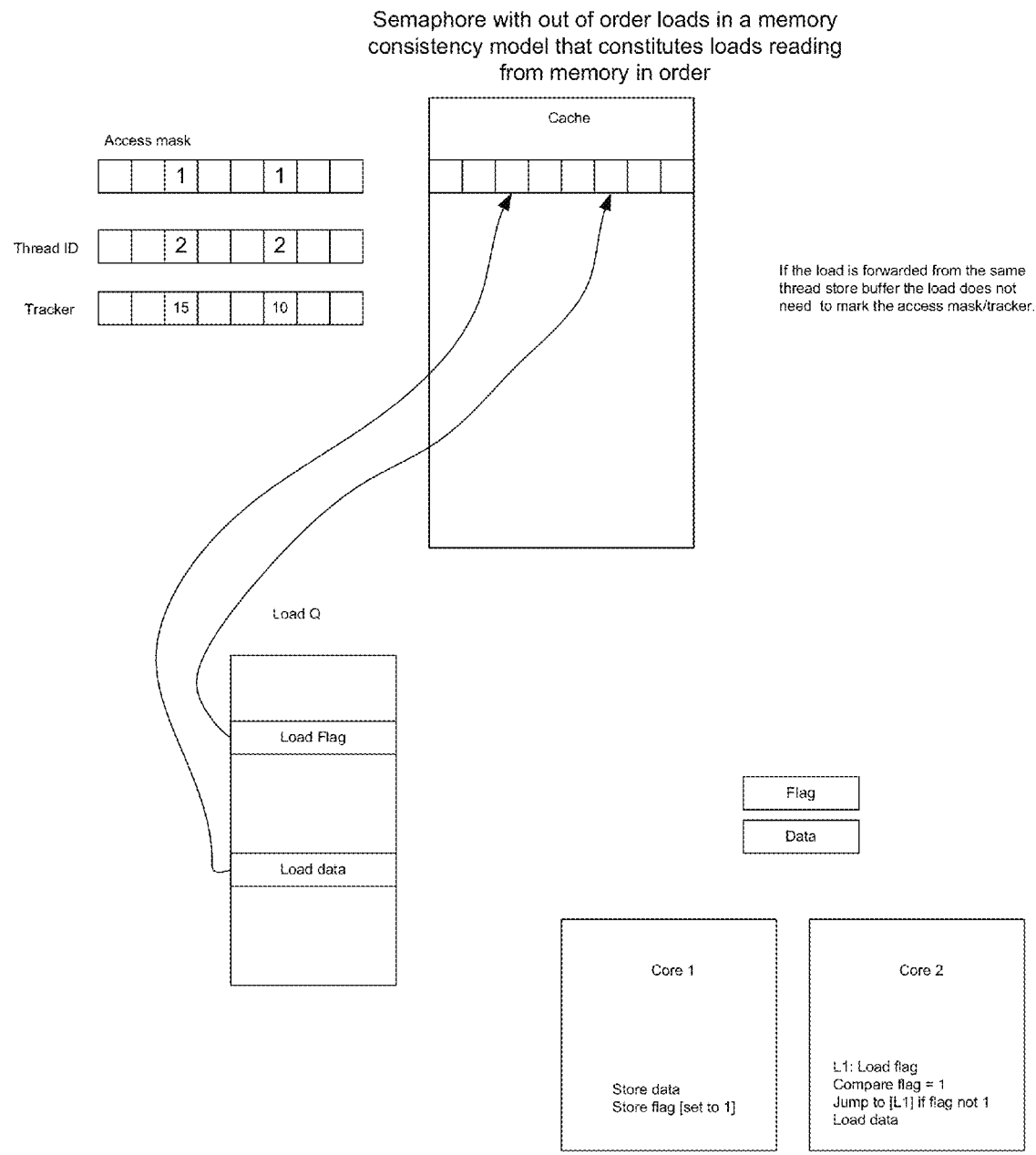
FIG. 17 shows a semaphore implementation with out of order loads in a memory consistency model that constitutes loads reading from memory in order, in accordance with one embodiment of the present invention.

FIG. 17 shows a semaphore implementation with out of order loads in a memory consistency model that constitutes loads reading from memory in order, in accordance with one embodiment of the present invention. As used herein, the term semaphore refers to a data construct that provides access control for multiple threads/cores to common resources.

In the FIG. 17 embodiment, the access mask is used to control accesses to memory resources by multiple threads/cores. The access mask functions by tracking which words of a cache line have pending loads. An out of order load sets the mask bit when accessing the word of the cache line, and clears the mask bit when that load retires. If a store from another thread/core writes to that word while the mask bit is set, it will signal the load queue entry corresponding to that load (e.g., via the tracker) to be miss-predicted/flushed or retried with its dependent instructions. The access mask also tracks thread/core.

In this manner, the access mask ensures the memory consistency rules are correctly implemented. Memory consistency rules dictates that stores update memory in order and loads read from memory in order for this semaphore to work across the two cores/threads. Thus, the code executed by core 1 and core 2, where they both access the memory locations "flag" and "data", will be executed correctly.

Figure 18:
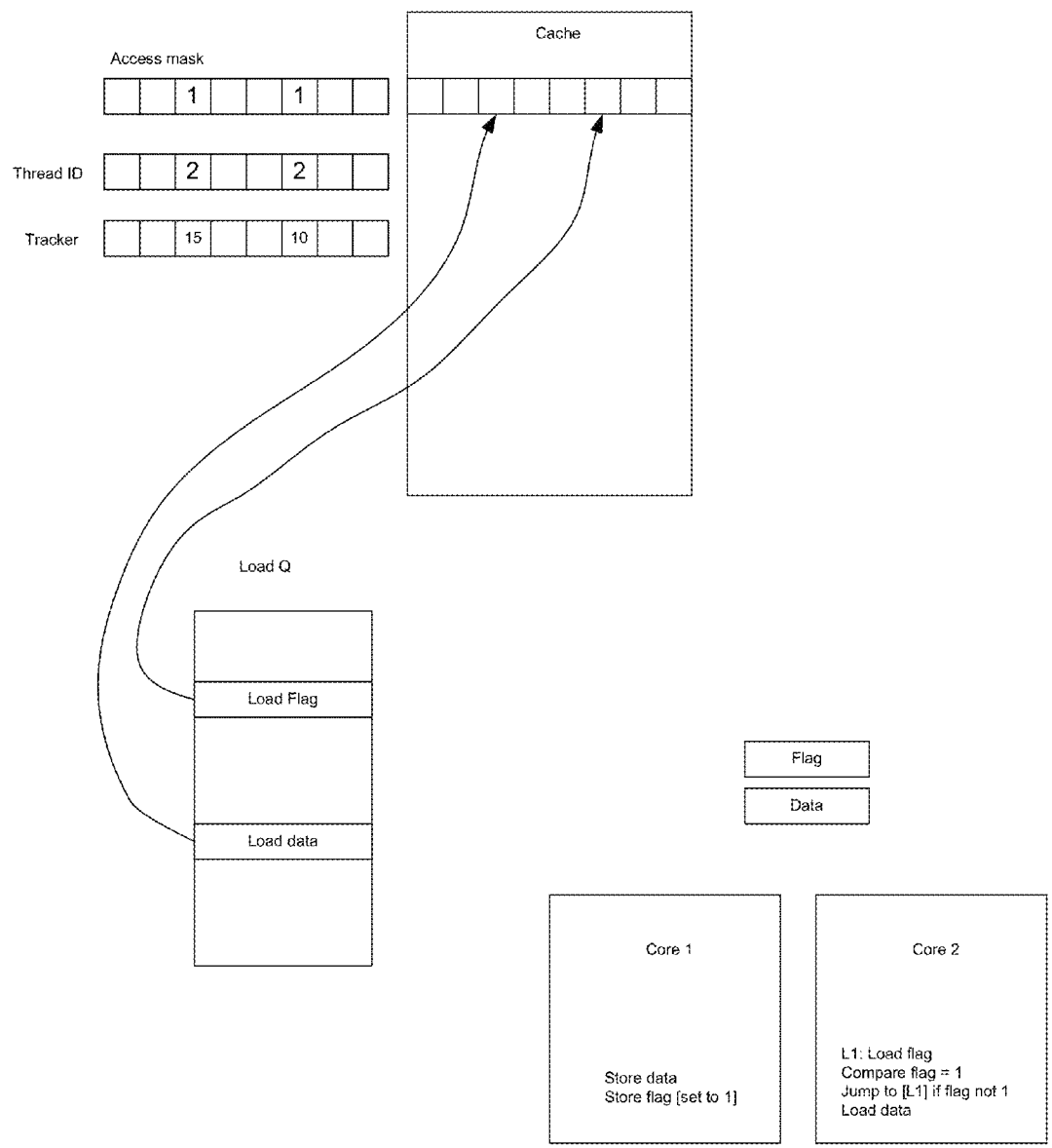
FIG. 18 shows an out of order loads into memory consistency model that constitutes loads reading for memory in order by the use of both a lock-based model and a transaction-based model in accordance with one embodiment of the present invention.

FIG. 18 shows an out of order loads into memory consistency model that constitutes loads reading for memory in order by the use of both a lock-based model and a transaction-based model in accordance with one embodiment of the present invention.

As described above, memory consistency rules dictate that stores update memory in order and loads reefer memory in order in order that the two cores/threads communicate properly. In the bottom right-hand side of FIG. 18 two cores are shown, core 1 and core 2. Two memory resources are used, flag and data, implement communication and share data between the core 1 and core 2 correctly. For example, when core 1 wants to pass data to core 2, as indicated by the code within core 1 it will store the data and then set the flag. As indicated by the code within core 2, core 2 will load the flag and check whether the flag is equal to 1. If the flag is not equal to 1, core 2 will jump back and keep checking the flag until it does equal 1. At that point in time, it will load the data.

With an out of order architecture where loads and stores execute out of order, a lock based memory consistency model can be used to ensure the two entities (e.g., core 1 and core 2) maintain in order memory consistency semantics. This is shown through the use of an access mask, a thread ID register, and the tracker register. The lock is set by setting the corresponding access mask bit of any load within the critical section of the code. If any access from another thread/core to that cache line word happens, the lock will prevent that access. In one embodiment, this can be implemented by treating the access as a miss. When the lock is cleared, accesses to that word are allowed.

Alternatively, a transactional-based method can be used to maintain in order memory consistency semantics. With the transactional-based method, atomicity is set by setting the corresponding access mask bit of any load within a transaction. If any access from another thread/core or parallel transaction to that cache line word happens while the mask bit is set it will signal the load queue entry corresponding to that load (e.g., via the tracker) to be miss-predicted/flushed or retried with its dependent instructions. The access mask also tracks thread/core. The mask bit will be cleared when that transaction is concluded. The thread ID register is used to track which thread is accessing which word of a unified store queue entry.

Figure 19:
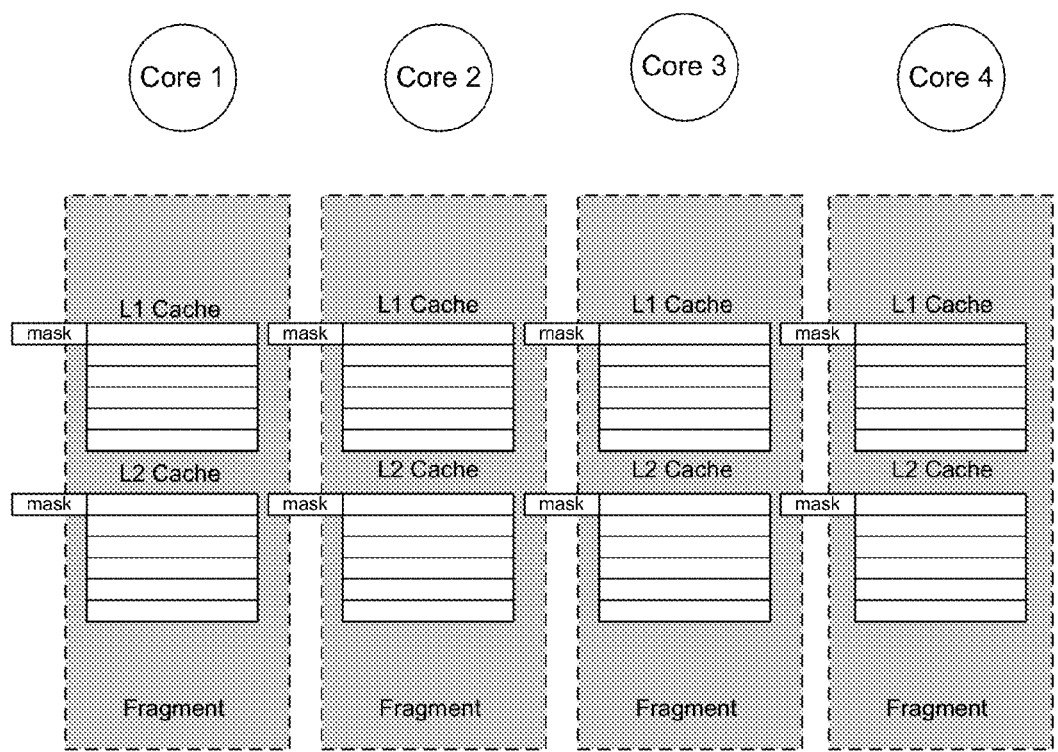
FIG. 19 shows a plurality of cores of a multi-core segmented memory subsystem in accordance with one embodiment of the present invention.

FIG. 19 shows a plurality of cores of a multi-core segmented memory subsystem in accordance with one embodiment of the present invention. This embodiment shows how loads from within the multi-core segmented memory subsystem will be prevented from accessing a word that is marked as part of a transaction in progress (e.g., similar to a locked case).

It should be noted that if this multi-core segmented subsystem is a part of a larger cluster where there are external processors/cores/clusters with shared memory subsystems. In this case, the load's belonging to the other external processors/cores/clusters would proceed and would not be prevented from loading from any memory location not paying attention if that memory location is part of a transactional access. However, all loads will mark the access mask to notify future stores that are part of a transaction.

Snooping stores coming from other processors compare their addresses to the mask. If a store sees the address it is trying to store to is marked in the access mask from another thread load (a load that is part of a transaction), then the store will cause that load to be miss predicted. Otherwise, the mark will be cleared upon that load retiring (e.g., thereby completing the transaction).

Figure 20:
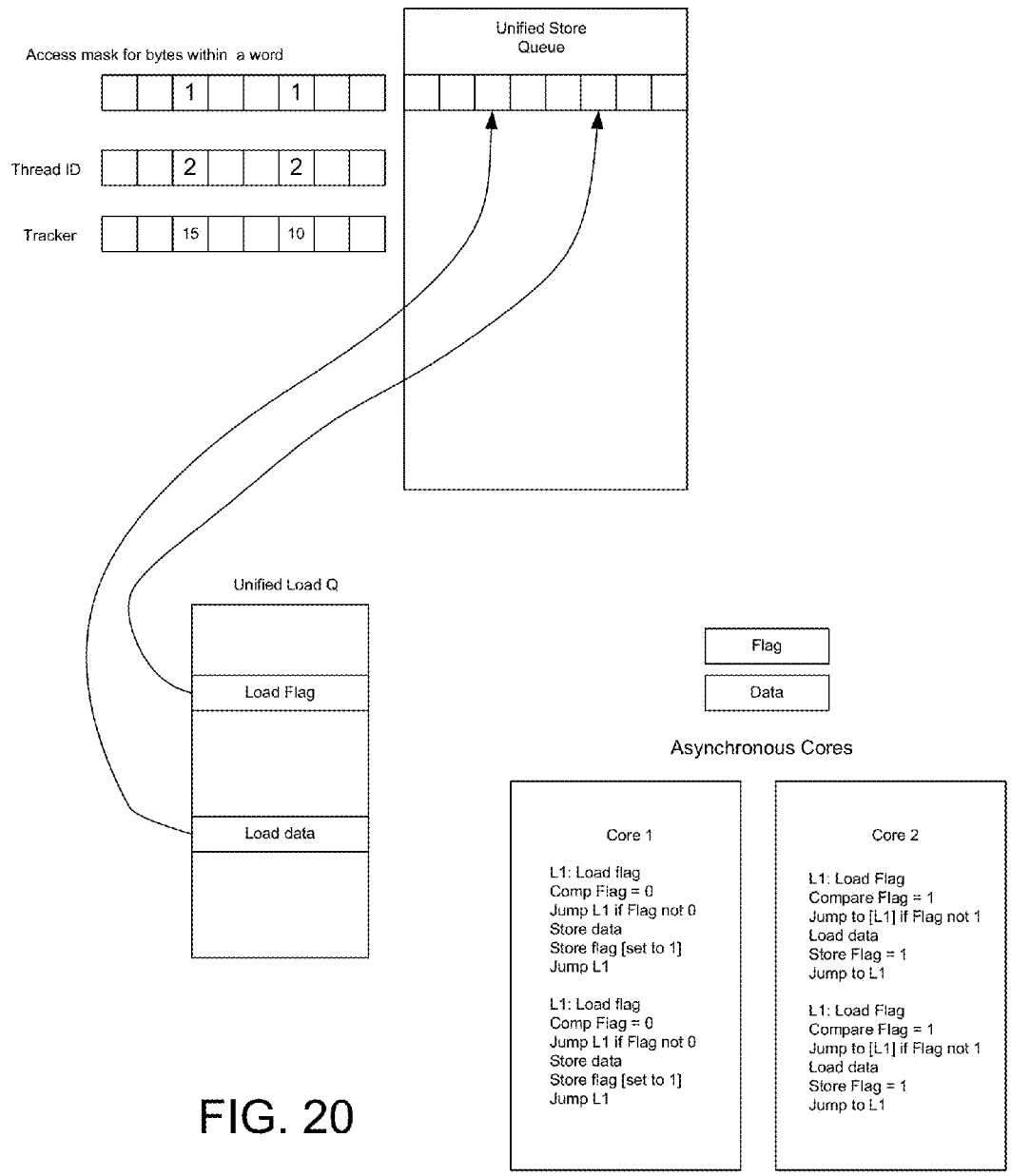
FIG. 20 shows a diagram of asynchronous cores accessing a unified store queue where stores can afford from either thread based on store seniority in accordance with one embodiment of the present invention.

FIG. 20 shows a diagram of asynchronous cores accessing a unified store queue where stores can forward data to loads in either thread based on store seniority in accordance with one embodiment of the present invention.

As described above, memory consistency rules dictates that stores update memory in order and loads reads from memory in order so that the cores/threads communicate properly. In the bottom right-hand side of FIG. 20 two cores are shown, core 1 and core 2. The two cores are asynchronous and execute the code indicated within each core to access the flag and the data memory resources.

In the FIG. 20 embodiment, the unified store queue is agnostic to any of the plurality of threads that may access it. In this implementation, stores from different threads can forward to loads of different threads while still maintaining in order memory consistency semantics by following a set of algorithmic rules. Threads can forward from each other based on store seniority.

A store is senior when all loads and stores before it in the same thread have been executed. A thread that receives a forward from another thread cannot retire loads/stores independently. Threads have to miss predict conditionally in case other threads from which they receive forwarding have miss predicted. A particular load can forward from the same thread forwarding store or a from a different thread senior store if there is no store forwarding to it within the same thread.

With the FIG. 20 method, atomicity is set by setting the corresponding access mask bit of any accesses to bytes within a word in the unified store queue entry. If any access from another thread/core or parallel transaction to that store queue entry word happens while the mask bit is set it will signal the load queue entry corresponding to that load (e.g., via the tracker) to be miss-predicted/flushed or retried with its dependent instructions. The access mask also tracks thread/cores. The mask bit will be cleared when that transaction is concluded.

Figure 21:
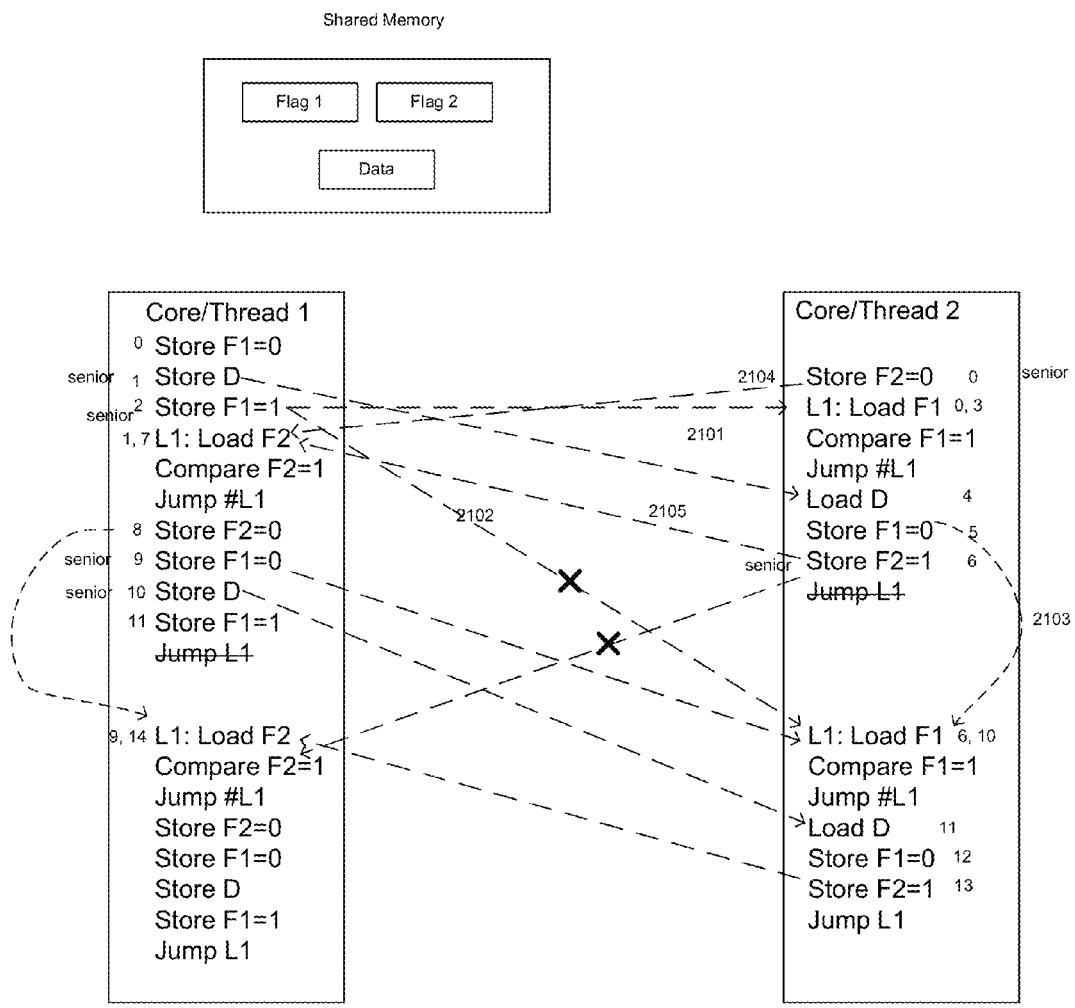
FIG. 21 shows a diagram depicting the functionality where stores have seniority over corresponding stores in other threads in accordance with one embodiment of the present invention.

FIG. 21 shows a diagram depicting the functionality where stores have seniority in accordance with one embodiment of the present invention. As depicted in FIG. 21, a particular load will forward from the same thread forwarding store. If there is no forwarding from within the thread it can forward from a different thread senior store. This principle functions in a case where multiple cores/threads are accessing shared memory. In such cases, stores can forward from either thread to loads from either thread based on store seniority, however, only if there is no forwarding from within the thread to a particular load. A store is senior when all loads and stores before it in the same thread have executed.

Additionally, it should be noted that a thread cannot retire loads/stores independently. The thread has to load miss predict when another thread from which it received a forwarding store miss predicts or flushes.

FIG. 21 visually depicts an exemplary stream of execution between two asynchronous cores/threads (e.g., core/thread 1 and core/thread 2). The lines 2101-2105 show the manner in which stores forward to different loads based on their seniority. To help illustrate how seniority progresses from store to store, numbers are listed next each instruction to show the different stages of execution as it progresses from 0 to 14. In particular, it should be noted the manner in which the store indicated by the line 2103 forwards to a load within the same thread, in accordance with the rules described above. Thus, as described above, a load that forwards from within their own thread cannot forward from any adjacent thread. This is shown by the black crosses across the forwarding lines.

Figure 22:
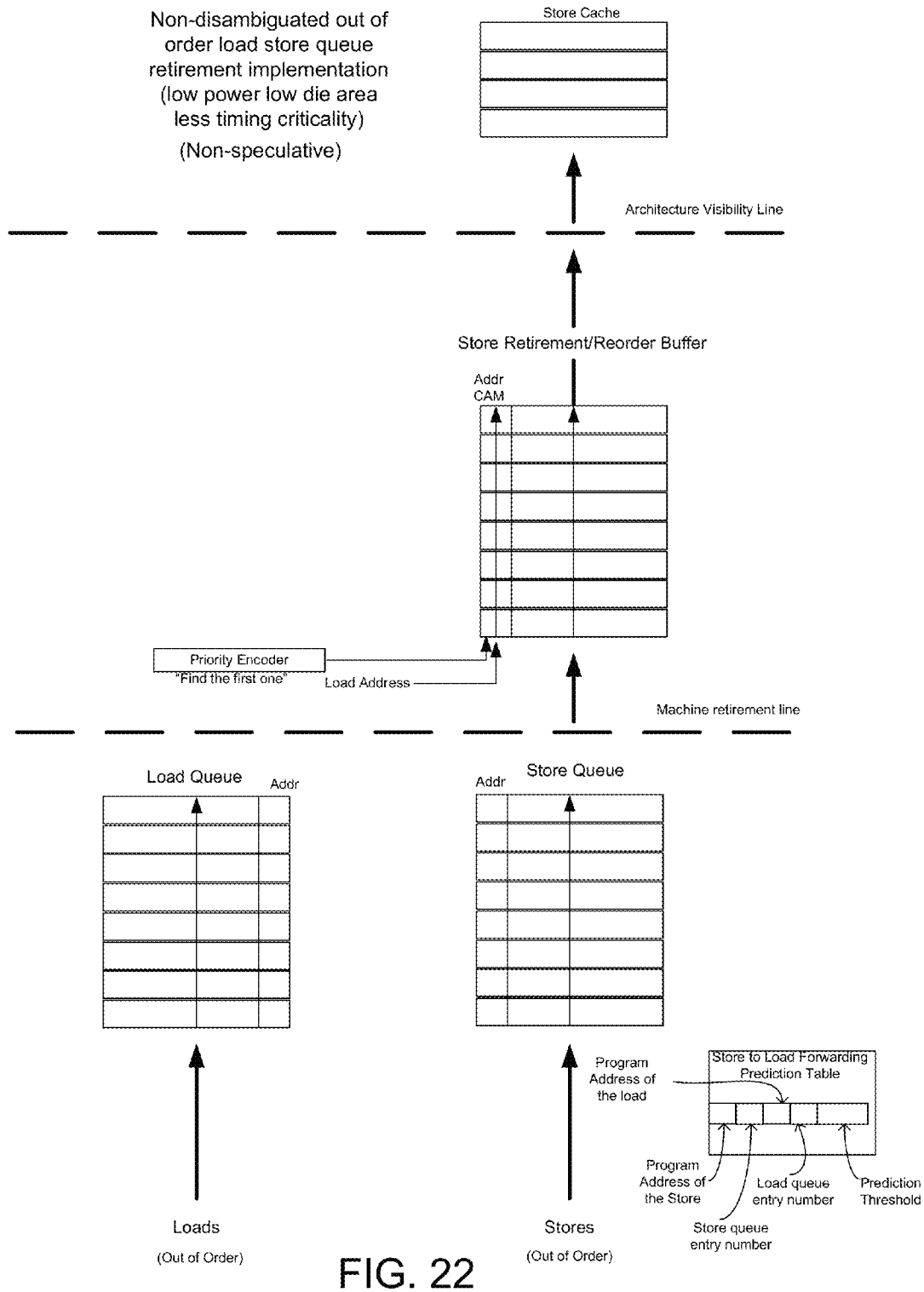
FIG. 22 shows a non-disambiguated out of order load store queue retirement implementation in accordance with one embodiment of the present invention.

FIG. 22 shows a non-disambiguated out of order load store queue retirement implementation in accordance with one embodiment of the present invention (e.g., yielding low power, low die area, and less timing criticality) that is non-speculative.

The store retirement/reorder buffer (SRB) can operate in two implementations, a retirement implementation and a reorder implementation.

In a retirement implementation, stores are loaded into the SRB from the store queue in original program order at retirement of stores, such that stores that are earlier in original program order are at the top of the SRB. A subsequent load can then look for address matches (e.g., using address CAM), and forward from the matching entry in the SRB/store cache. In cases where there are two or more address matches, the priority encoder can locate the correct forwarding entry by scanning for the first one. This saves a trip to memory and allows the machine to make forward progress. If a load is dispatched and the store that forwards to it has already retired to the SRB/store cache, that load forwards from the SRB/store cache and records the pairing relationship in the prediction table. To detect the case where a load is dispatched before the store that forwards to it is retired to the SRB/store cache, the load has to create an address mask where it marks its own address. This can be implemented in different ways (e.g., the FIG. 17 embodiment).

As discussed above, FIG. 17 describes an access mask that functions by tracking which words of a cache line have pending loads. An out of order load sets the mask when accessing the word of the cache line and clears the mask bit when that load retires. If a store from the same thread/core detects at its retirement that it writes to that word while the mask bit is set it will signal the load queue entry corresponding to that load (via the tracker) to be miss-predicted/flushed or retried with its dependent instructions. The access mask also tracks thread/core.

FIG. 22 is a non-disambiguation load store queue, in the fact that it does not include the corresponding hardware to disambiguate out of order loads and stores. Loads and stores dispatch out of order as machine resources allow. Traditionally, address matching and corresponding disambiguation hardware are used in both the load queue and the store queue to ensure correct store queue entries are forwarded to the requesting load queue entries, as described above (e.g., FIG. 5 and FIG. 6). The contents of the load queue and the store queue are not visible to outside cores/threads.

In FIG. 22, dispatched load and store addresses are not disambiguated with respect to entries in the store queue or the load queue. The load/store queues are now streamlined buffer implementations with reduced die area, power consumption, and timing requirements. The SRB will perform the disambiguation functionality. As address matches are detected in the SRB, those matches are used to populate entries in the store to load forwarding prediction table to enforce the forwarding as the execution of the instruction sequence goes forward.

As loads are dispatched, they check the prediction table to see if they are paired with a corresponding store. If the load is paired and that particular store has already dispatched, the load will forward from that store queue entry number as recorded in the prediction table. If the store has not been dispatched yet, then the load will register its load queue entry number in the prediction table and will mark itself in the load queue to wait for the store data to be forwarded. When the store is dispatched later, it checks the prediction table to obtain the load queue entry number and forward to that load.

Once forwarding is detected for a load store pair, the PC and the addresses of the load store pair are recorded so that the address match is verified. If the address matches, the load will not dispatch until the store data is dispatched and the load will be marked to forward from it. The prediction threshold is used to set a confidence level in the forwarding relationship between load store pairs.

Figure 23:
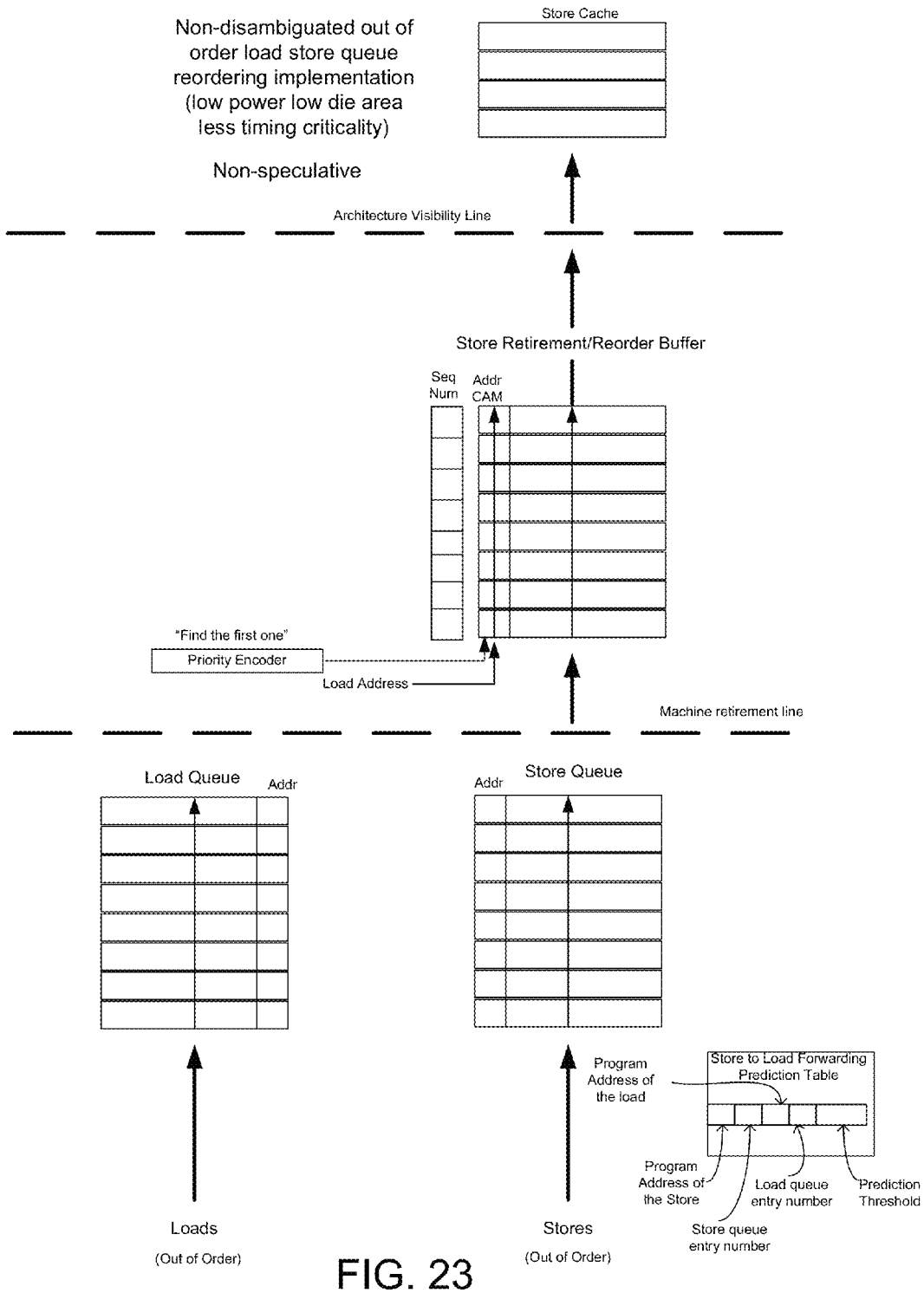
FIG. 23 shows a reorder implementation of a non-disambiguated out of order load store queue reordering implementation in accordance with one embodiment of the present invention.

FIG. 23 shows a reorder implementation of a non-disambiguated out of order load store queue reordering implementation in accordance with one embodiment of the present invention. FIG. 23 also yields low power, low die area, and less timing criticality that is non-speculative.

The store retirement/reorder buffer (SRB) can operate in two implementations, a retirement implementation and a reorder implementation.

In the FIG. 23 reorder implementation, store addresses are loaded into the SRB from the store queue out of order (e.g., as resources allow). As each store is allocated, it receives a sequence number. The SRB then functions by reordering stores according to their sequence number such that they reside in the SRB in original program order. Stores that are earlier in program order are at the top of the SRB. Subsequent loads then look for address matches and allocation age (the program order sequence number given at allocation time of loads and stores). As loads are dispatched, they look to the SRB, if they see an earlier store (in comparison to their own sequence number) that has not yet dispatched (no address calculation yet) one of two solutions can be implemented.

1. The load does not dispatch, it waits until all earlier stores have dispatched before it dispatches itself
2. The load dispatches and marks its address in the access mask of the cache (as shown in FIG. 17). Subsequent stores check the access mask and follow the same methodology as described in FIG. 17.

It should be noted that priority encoder functions as described above to locate the correct forwarding entry.

Figure 24:
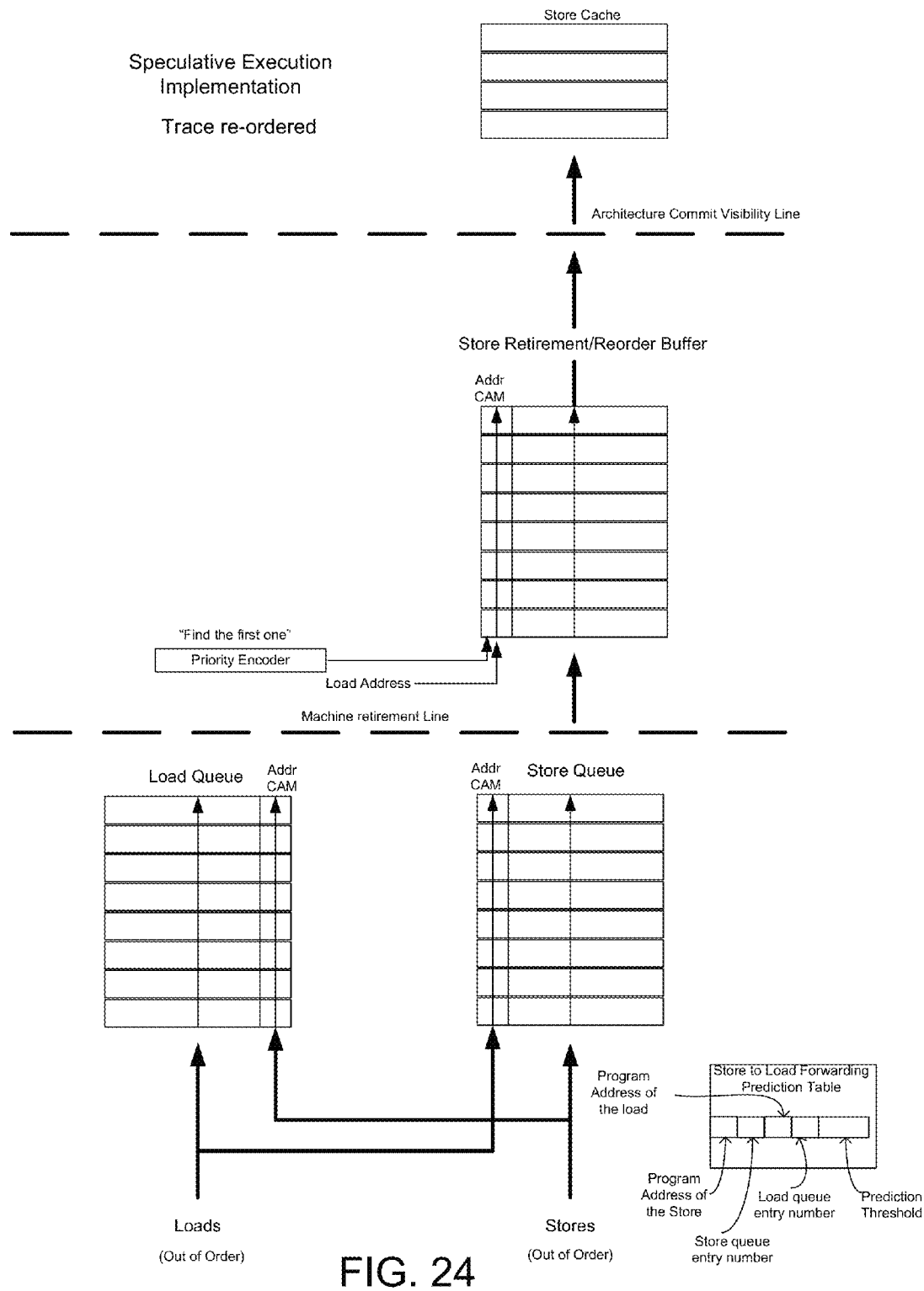
FIG. 24 shows an instruction sequence (e.g., trace) reordered speculative execution implementation in accordance with one embodiment of the present invention.

FIG. 24 shows an instruction sequence (e.g., trace) reordered speculative execution implementation in accordance with one embodiment of the present invention. In a speculative mode, stores are moved into the SRB from the store queue in original program order at retirement of stores, such that stores that are earlier in original program order are at the top of the SRB. A subsequent load can then look for address matches (e.g., using address CAM), and forward from the matching entry in the SRB/store cache. In cases where there are two or more address matches, the priority encoder can locate the correct forwarding entry by scanning for the first one. This allows the machine to make forward progress. If a load is dispatched (the first time it checks the SRB) and the store that forwards to it is retired to the SRB/store cache, that load forwards from the SRB/store cache and records it pairing relationship n the prediction table. To detect the case where a load is dispatched before the store that forwards to it is retired to the SRB/store cache, the load upon retirement will check the store queue one more time. If the load finds a forwarding store match, it will signal the load queue entry corresponding to that load to be miss-predicted/flushed or retried with its dependent instructions. The forwarding predictor will learn from this miss-forwarding.

It should be noted that the load will be able to check the SRB for a matching address against a previous store because all the stores in SRB will not be committed to external cache/store cache architecturally visible state (leave the SRB storage to visible memory) till all the instructions in the trace including the mentioned load had reached the trace commit state (e.g., all become non speculative and trace as a whole is ready to commit).

The store retirement/reorder buffer functionally enables speculative execution. The results of speculative execution can be saved in the store retirement/reorder buffer until speculative outcomes are known. The speculative results are not visible architecturally. Once speculative state is committed, stores can be committed to the store cache. Before committing the state, any exceptions or loads and stores that need to be retried will signal an exception or a miss-predicts that will prevent the state commit. Forwarding miss-predictions between stores and corresponding loads can be fixed (e.g., by causing a miss-prediction that flushes the machine at the miss=forwarding load point, or the like).

Additional descriptions of the SRB functionality can be found in commonly owned U.S. Publication No. 2013/0024661 by Abdallah.

Figure 25:
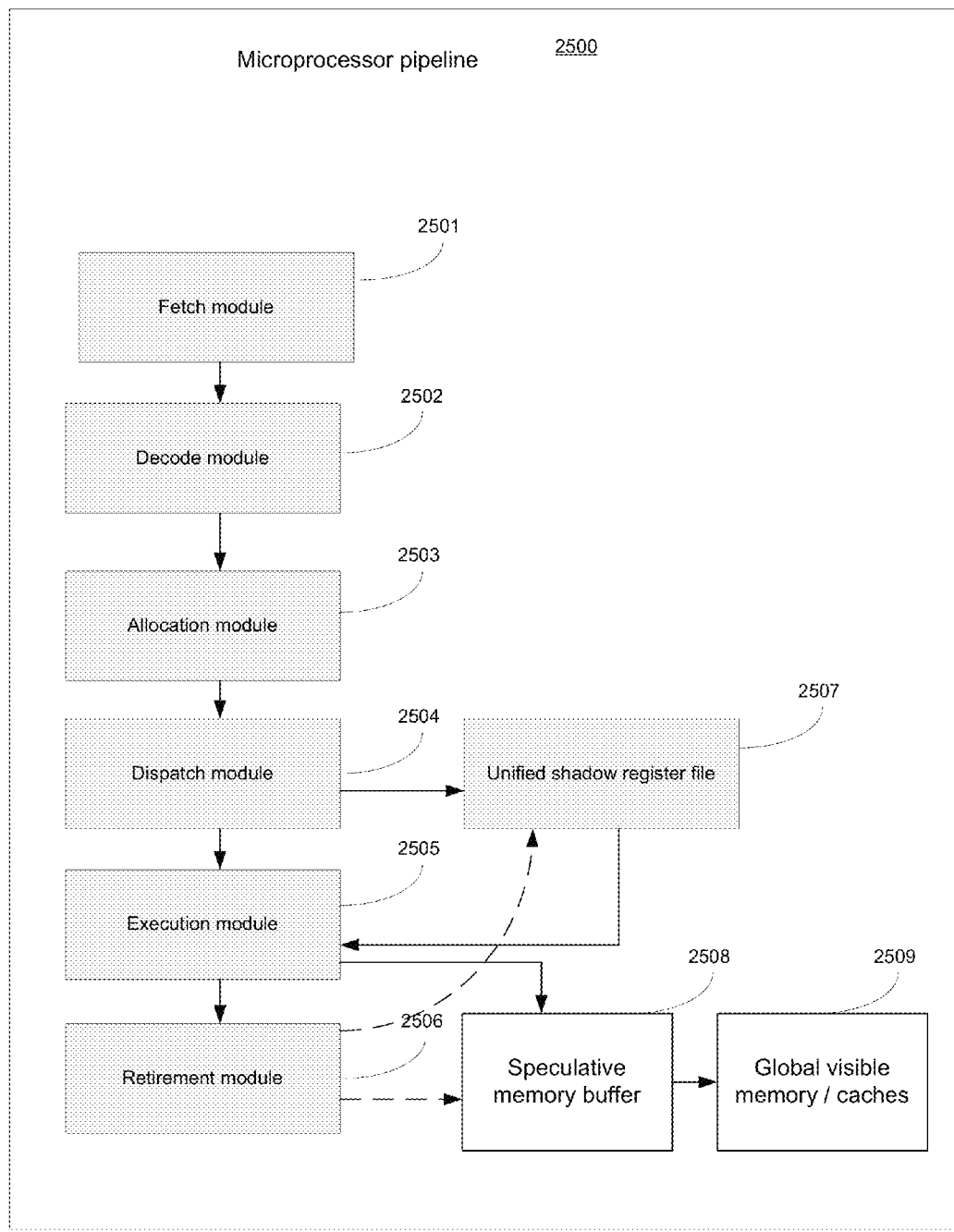
FIG. 25 shows a diagram of an exemplary microprocessor pipeline in accordance with one embodiment of the present invention.

FIG. 25 shows a diagram of an exemplary microprocessor pipeline 2500 in accordance with one embodiment of the present invention. The microprocessor pipeline 2500 includes a fetch module 2501 that implements the functionality of the process for identifying and extracting the instructions comprising an execution, as described above. In the FIG. 25 embodiment, the fetch module is followed by a decode module 2502, an allocation module 2503, a dispatch module 2504, an execution module 2505 and a retirement modules 2506. It should be noted that the microprocessor pipeline 2500 is just one example of the pipeline that implements the functionality of embodiments of the present invention described above. One skilled in the art would recognize that other microprocessor pipelines can be implemented that include the functionality of the decode module described above.

For purposes of explanation, the foregoing description refers to specific embodiments that are not intended to be exhaustive or to limit the current invention. Many modifications and variations are possible consistent with the above teachings. Embodiments were chosen and described in order to best explain the principles of the invention and its practical applications, so as to enable others skilled in the art to best utilize the invention and its various embodiments with various modifications as may be suited to their particular uses.

What is claimed is:

1. A method for forwarding data from the store instructions to a corresponding load instruction in an out of order processor, comprising:
    accessing an incoming sequence of instructions;
    reordering the incoming sequence of instructions in accordance with processor resources for dispatch and execution;
    ensuring a closest earlier store in machine order to a corresponding load by determining:
    if said store has an actual age but said corresponding load does not have an actual age, then said store is earlier than said corresponding load;
    if said corresponding load has an actual age but said store does not have an actual age, then said corresponding load is earlier than said store;
    if neither said corresponding load or said store have an actual age, then a virtual identifier table is used to determine which is earlier, wherein the virtual identifier table functions by keeping track of associations between store instructions and load instructions by storing corresponding machine ID and machine resources that correspond to each store instruction and a load instruction unique identifier; and
    if both said corresponding load and said store have actual ages, then the actual ages are used to determine which is earlier.

2. The method of claim 1, wherein the ensuring a closest earlier store in machine order to a corresponding load maintains program sequential semantics while supporting speculative execution.

3. The method of claim 1, wherein entries in the virtual identifier table allow the store and the corresponding load to be associated with machine resources that were assigned at allocation.

4. The method of claim 1, wherein a prediction table is used for detecting forwarding for a load store pair, wherein a program counter of the load store pair is recorded so that a load will wait for an address of a corresponding store in the load store pair to be dispatched and calculated prior to forwarding.

5. The method of claim 1, wherein the processor includes a load queue having disambiguation logic comprising a load queue entry number, a store initial age stamp, a store actual age stamp, an initial load age and an actual load age.

6. The method of claim 1, wherein the processor includes a store queue having disambiguation logic comprising a store queue entry number, a store initial age stamp, a store actual age stamp, an initial store age and an actual store age.

7. A microprocessor, comprising:
    a core and a load store buffer, wherein the load store buffer forwards data from the store instructions to a corresponding load instruction in an out of order processor by:
    accessing an incoming sequence of instructions;
    reordering the incoming sequence of instructions in accordance with processor resources for dispatch and execution;
    ensuring a closest earlier store in machine order for to a corresponding load, by determining:
    if said store has an actual age but said corresponding load does not have an actual age, then said store is earlier than said corresponding load;
    if said corresponding load has an actual age but said store does not have an actual age, then said corresponding load is earlier than said store;
    if neither said corresponding load or said store have an actual age, then a virtual identifier table is used to determine which is earlier, wherein the virtual identifier table functions by keeping track of associations between store instructions and load instructions by storing corresponding machine ID and machine resources that correspond to each store instruction and a load instruction unique identifier; and if both said corresponding load and said store have actual ages, then the actual ages are used to determine which is earlier.

8. The microprocessor of claim 7, wherein the ensuring a closest earlier store in machine order to a corresponding load maintains program sequential semantics while supporting speculative execution.

9. The microprocessor of claim 7, wherein entries in the virtual identifier table allow the store and the corresponding load to be associated with machine resources that were assigned at allocation.

10. The microprocessor of claim 7, wherein a prediction table is used for detecting forwarding for a load store pair, wherein a program counter of the load store pair is recorded so that a load will wait for an address of a corresponding store in the load store pair to be dispatched and calculated prior to forwarding.

11. The microprocessor of claim 7, wherein the processor includes a load queue having disambiguation logic comprising a load queue entry number, a store initial age stamp, a store actual age stamp, an initial load age and an actual load age.

12. The microprocessor of claim 7, wherein the processor includes a store queue having disambiguation logic comprising a store queue entry number, a store initial age stamp, a store actual age stamp, an initial store age and an actual store age.

13. A computer system, comprising:
  a microprocessor having a core and a load store buffer, wherein the load store buffer forwards data from the store instructions to a corresponding load instruction in an out of order processor by:
  accessing an incoming sequence of instructions;
  reordering the incoming sequence of instructions in accordance with processor resources for dispatch and execution;
  ensuring a closest earlier store in machine order for to a corresponding load, by determining:
  if said store has an actual age but said corresponding load does not have an actual age, then said store is earlier than said corresponding load;
  if said corresponding load has an actual age but said store does not have an actual age, then said corresponding load is earlier than said store;
  if neither said corresponding load or said store have an actual age, then a virtual identifier table is used to determine which is earlier, wherein the virtual identifier table functions by keeping track of associations between store instructions and load instructions by storing corresponding machine ID and machine resources that correspond to each store instruction and a load instruction unique identifier; and
  if both said corresponding load and said store have actual ages, then the actual ages are used to determine which is earlier.

14. The computer system of claim 13, wherein the ensuring a closest earlier store in machine order to a corresponding load maintains program sequential semantics while supporting speculative execution.

15. The computer system of claim 13, wherein entries in the virtual identifier table allow the store and the corresponding load to be associated with machine resources that were assigned at allocation.

16. The computer system of claim 13, wherein a prediction table is used for detecting forwarding for a load store pair, wherein a program counter of the load store pair is recorded so that a load will wait for an address of a corresponding store in the load store pair to be dispatched and calculated prior to forwarding.

17. The computer system of claim 13, wherein the processor includes a load queue having disambiguation logic comprising a load queue entry number, a store initial age stamp, a store actual age stamp, an initial load age and an actual load age.

18. The computer system of claim 13, wherein the processor includes a store queue having disambiguation logic comprising a store queue entry number, a store initial age stamp, a store actual age stamp, an initial store age and an actual store age.

* * * * *